(12) United States Patent
Iihoshi et al.

(10) Patent No.: US 12,505,709 B2
(45) Date of Patent: Dec. 23, 2025

(54) VEHICLE BODY MANAGEMENT SYSTEM

(71) Applicant: HITACHI CONSTRUCTION MACHINERY CO., LTD., Tokyo (JP)

(72) Inventors: Yoichi Iihoshi, Tokyo (JP); Satoshi Inose, Tokyo (JP); Kouji Fujita, Ibaraki (JP); Koichiro Ejiri, Tokyo (JP); Kenji Mizutani, Tokyo (JP); Kenichi Ajima, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 386 days.

(21) Appl. No.: 18/014,841

(22) PCT Filed: May 24, 2021

(86) PCT No.: PCT/JP2021/019633
§ 371 (c)(1),
(2) Date: Jan. 6, 2023

(87) PCT Pub. No.: WO2022/024523
PCT Pub. Date: Feb. 3, 2022

(65) Prior Publication Data
US 2023/0326267 A1     Oct. 12, 2023

(30) Foreign Application Priority Data

Jul. 28, 2020   (JP) .................................. 2020-127209

(51) Int. Cl.
*B60W 50/02*     (2012.01)
*B60K 6/46*      (2007.10)
(Continued)

(52) U.S. Cl.
CPC .............. *G07C 5/0825* (2013.01); *B60K 6/46* (2013.01); *B60L 50/13* (2019.02);
(Continued)

(58) Field of Classification Search
None
See application file for complete search history.

(56) References Cited

U.S. PATENT DOCUMENTS

| 6,726,594 B2 * | 4/2004 | Mizuno ............. | B60W 30/1819 477/37 |
| 8,103,397 B2 * | 1/2012 | Liang .................. | B60W 20/12 180/65.265 |

(Continued)

FOREIGN PATENT DOCUMENTS

| JP | 2011-501264 A | 1/2011 |
| JP | 2012-149510 A | 8/2012 |

(Continued)

OTHER PUBLICATIONS

International Preliminary Report on Patentability received in corresponding International Application No. PCT/JP2021/019633 dated Feb. 9, 2023.
International Search Report of PCT/JP2021/019633 dated Aug. 17, 2021.

*Primary Examiner* — Brian P Sweeney
*Assistant Examiner* — David Hatch
(74) *Attorney, Agent, or Firm* — MATTINGLY & MALUR, PC

(57) ABSTRACT

Managing a vehicle body including computing an efficiency value of a monitoring target, the monitoring target being the power train or a part or a subsystem of the power train, on the basis of information about the vehicle body, the information being sensed by a sensor provided to the vehicle body. An output terminal that outputs the efficiency value of the monitoring target. Determining whether a load parameter is larger than a load determination value set in advance, and computing the efficiency value of the monitoring target on the basis of input energy and output energy of the monitoring target on condition that the load parameter be (Continued)

larger than the load determination value, and recording the computed efficiency value of the monitoring target.

11 Claims, 15 Drawing Sheets

(51) Int. Cl.
*B60L 50/13* (2019.01)
*G07C 5/08* (2006.01)

(52) U.S. Cl.
CPC ...... *B60W 50/0205* (2013.01); *B60L 2210/20* (2013.01); *B60W 2510/0623* (2013.01); *B60W 2530/10* (2013.01); *B60W 2552/15* (2020.02); *B60Y 2200/92* (2013.01)

(56) References Cited

U.S. PATENT DOCUMENTS

| | | |
|---|---|---|
| 2009/0099886 A1 | 4/2009 | Greiner et al. |
| 2011/0178670 A1* | 7/2011 | Perkins ................ B60K 35/22 |
| | | 340/439 |
| 2016/0090076 A1* | 3/2016 | Tsuji .................... B60W 20/40 |
| | | 180/65.265 |
| 2016/0253853 A1 | 9/2016 | Yamamoto et al. |
| 2018/0053406 A1 | 2/2018 | Kawamata et al. |
| 2019/0049260 A1* | 2/2019 | Gaither ................ B60W 40/00 |

FOREIGN PATENT DOCUMENTS

| | | |
|---|---|---|
| JP | 6329904 B2 | 5/2018 |
| WO | 2014/045395 A1 | 3/2014 |
| WO | 2017/042897 A1 | 3/2017 |

* cited by examiner

EXAMPLE OF EXTRACTING DATA
BASED ON MANY PIECES
OF BASIC DATA FROM FIG. 10

FIG. 20  EXAMPLE OF EXTRACTING DATA UNDER HIGH-LOAD CONDITION
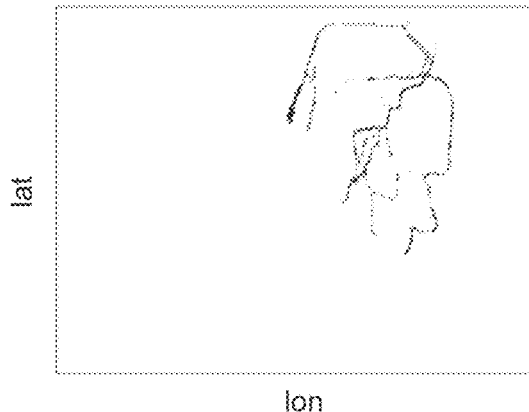
FIG. 21  EXAMPLE OF EXTRACTING DATA BASED ON MANY PIECES OF BASIC DATA FROM FIG. 20
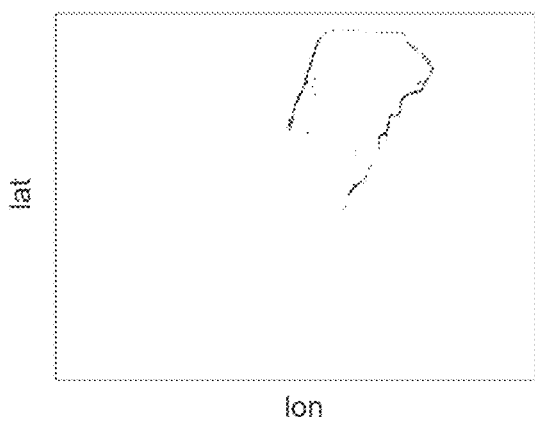
FIG. 22  EXAMPLE OF EXTRACTING DATA WHOSE FUEL INJECTION AMOUNT IS EQUAL TO OR MORE THAN CERTAIN AMOUNT FROM FIG. 21
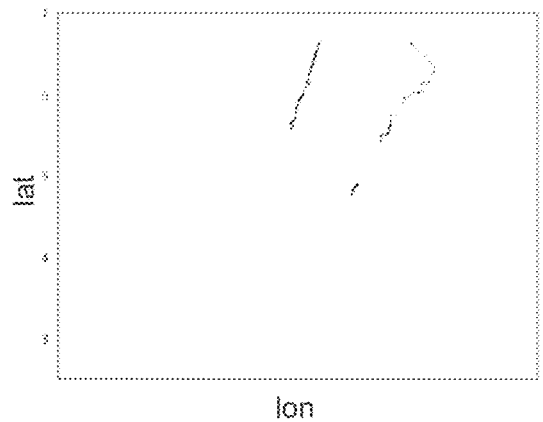

VEHICLE BODY MANAGEMENT SYSTEM

TECHNICAL FIELD

The present invention relates to a vehicle body management system that manages a vehicle body having a power train formed by a plurality of parts including a prime mover.

BACKGROUND ART

A driving skill improving technology (Patent Document 1) based on accumulation and analysis of vehicle body data, a damage preventing technology (Patent Document 2) for preventing damage to a vehicle body, and the like are known. Patent Document 1 discloses a technology that calculates fuel consumption (fuel consumption amount/distance) in a same travelling section, and evaluates the driving skills of a driver by using section fuel consumption normalized by a loading amount as a reference. Patent Document 2 discloses a technology that prevents vehicle body damage by limiting a loading amount such that a total effective gradient is in a predetermined range.

PRIOR ART DOCUMENT

Patent Documents

Patent Document 1: Japanese Patent No. 6329904
Patent Document 2: JP-2011-501264-T

SUMMARY OF THE INVENTION

Problem to be Solved by the Invention

However, in Patent Documents 1 and 2, processing is performed on an assumption that a vehicle body is in a normal state. Therefore, a proper result may not be obtained in a state in which an abnormality has occurred in an engine, a generator, an AC-DC converter, an inverter, a motor, or the like constituting a power train. An abnormality in the power train is a factor in increasing a discharged amount of carbon dioxide and increasing an amount of fuel consumption. Also from a viewpoint of suppressing effects on the environment and fuel cost, it is important to grasp an abnormality in the power train accurately. While an abnormality in the power train may be determined on the basis of the section fuel consumption, the section fuel consumption is significantly increased or decreased depending on the driving skills of the driver and a travelling environment irrespective of the presence or absence of an abnormality in the power train, and it is therefore difficult to determine an abnormality in the power train rationally from the section fuel consumption.

It is an object of the present invention to provide a vehicle body management system that can determine an abnormality in the power train rationally.

Means for Solving the Problem

In order to achieve the above object, according to the present invention, there is provided a vehicle body management system for managing a vehicle body having a power train formed by a plurality of parts including a prime mover, the vehicle body management system including: a processing device configured to compute efficiency of a monitoring target, the monitoring target being the power train or a part or a subsystem of the power train, on the basis of information about the vehicle body, the information being sensed by a sensor provided to the vehicle body; and an output terminal that outputs the efficiency of the monitoring target, the efficiency being computed by the processing device, the processing device being configured to compute a load parameter of the power train, determine whether the load parameter is larger than a load determination value set in advance, compute the efficiency value of the monitoring target on the basis of input energy and output energy of the monitoring target on condition that the load parameter be larger than the load determination value, and record the computed efficiency value of the monitoring target.

Advantage of the Invention

According to the present invention, it is possible to determine an abnormality in the power train rationally.

BRIEF DESCRIPTION OF THE DRAWINGS

FIG. 20 is a diagram showing an example in which an average value of the fuel injection amount for each mesh is plotted in a position coordinate system.

FIG. 21 is a diagram showing an example of extracting data whose number of pieces of sampling data per mesh is larger than a predetermined value from the data of FIG. 20.

FIG. 22 is a diagram showing an example of extracting data whose fuel injection amount is larger than a predetermined value from the data of FIG. 21.

MODES FOR CARRYING OUT THE INVENTION

Embodiments of the present invention will hereinafter be described with reference to the drawings.

First Embodiment

—Vehicle Body—

Figure 1:
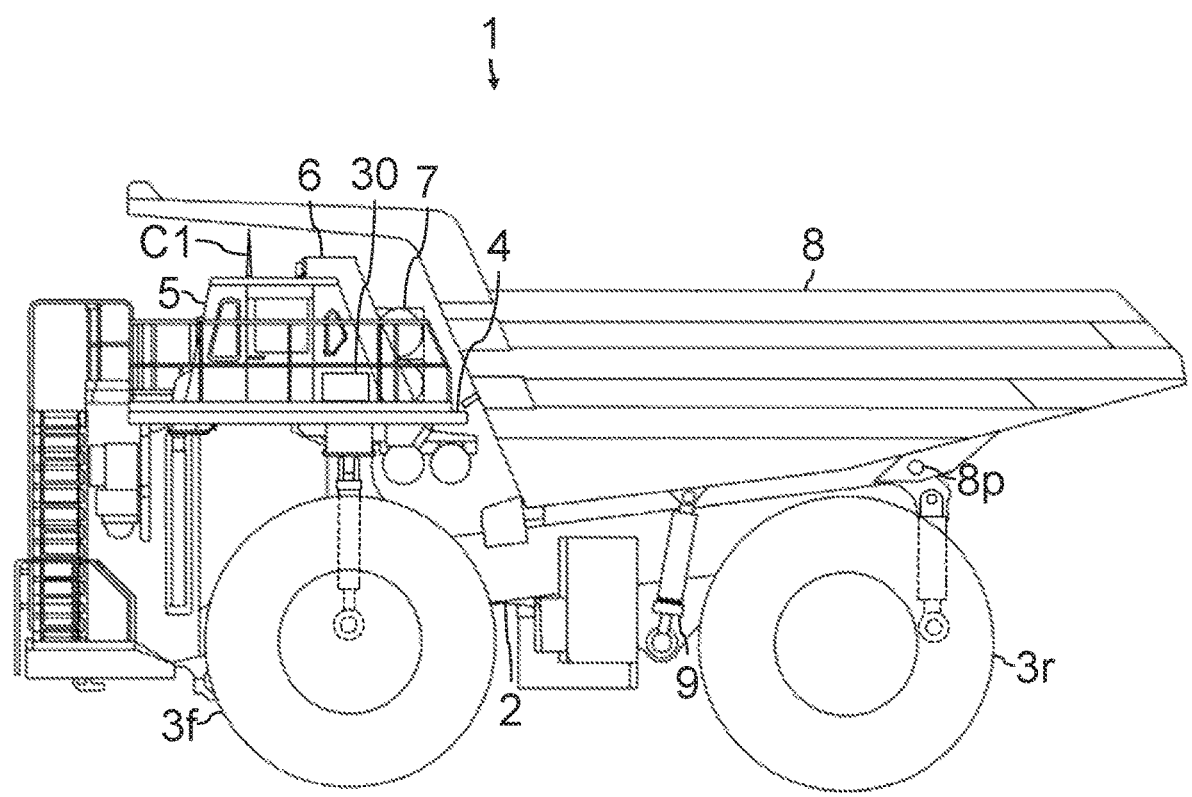
FIG. 1 is a diagram showing a dump truck as an example of a vehicle body to be managed by a vehicle body management system according to a first embodiment of the present invention.

FIG. 1 is a diagram showing a dump truck as an example of a vehicle body to be managed by a vehicle body management system according to a first embodiment of the present invention. The dump truck 1 shown in the figure includes a vehicle body frame 2 and a plurality of wheels rotatably provided to the vehicle body frame 2. The wheels include a left and a right front wheel 3f and left and right rear wheels 3r. The front wheels 3f are arranged one at each of both a left and a right end of a front portion of the vehicle body frame 2. The rear wheels 3r are arranged two at each of both a left and a right end of a rear portion of the vehicle body frame 2. The front wheels 3f are steered wheels steered according to a steering angle input via a steering wheel or the like, and are driven wheels driven by the rear wheels 3r via a road surface of a travelling road on which the dump truck 1 travels. Rotating shafts of the rear wheels 3r as driving wheels are coupled with a left and a right travelling electric motor 15 (FIG. 2), which drive the left and right rear wheels 3r, and reduction gears 19 (FIG. 2), which adjust the speed of rotation of the left and right rear wheels 3r.

In addition, the dump truck 1 is provided with a deck 4, a cab 5, a control cabinet 6, and a plurality of grid boxes 7. The deck 4 is a floor on which an operator walks. The deck 4 is disposed above the front wheels 3f. The cab 5 is an operation room boarded by the operator. The cab 5 is installed on the upper surface of the deck 4. The cab 5 is provided with not only a cab seat in which the operator sits but also operation pedals (an accelerator pedal and a brake pedal or the like) that command the travelling speed of the dump truck 1 and the above-described steering wheel. The control cabinet 6 is a room that houses various kinds of power apparatuses. The control cabinet 6 is mounted on a front portion of the vehicle body. The grid boxes 7 are a device that dissipates, as heat, excess energy of regenerative power generated at a time of braking in a power train 10 (FIG. 2) of the dump truck 1. The grid boxes 7 are arranged in the rear of the control cabinet 6.

The dump truck 1 is further provided with a cargo bed 8 and a hoist cylinder 9. The cargo bed 8 is a platform on which a cargo such as soil, ore, or the like is loaded. The cargo bed 8 is coupled with the vehicle body frame 2 via a hinge pin 8P, and rises and falls with respect to the vehicle body frame 2. The hoist cylinder 9 in a position forward of the hinge pin 8p couples the vehicle body frame 2 with the cargo bed 8, and expands and contracts to make the cargo bed 8 rise and fall. A prime mover 11 (FIG. 2), a generator 12 (FIG. 2), and the like are arranged in a part hidden by the front wheel 3f of the dump truck 1 in FIG. 1. A vehicle-mounted controller 30 (FIG. 3) is mounted above these apparatuses.

Incidentally, the dump truck 1 is provided with a communicating device C1 for sending and receiving data to and from an output terminal 51 (FIG. 3), a server 40 (FIG. 3) located at a remote place, and the like.

—Power Train—

Figure 2:
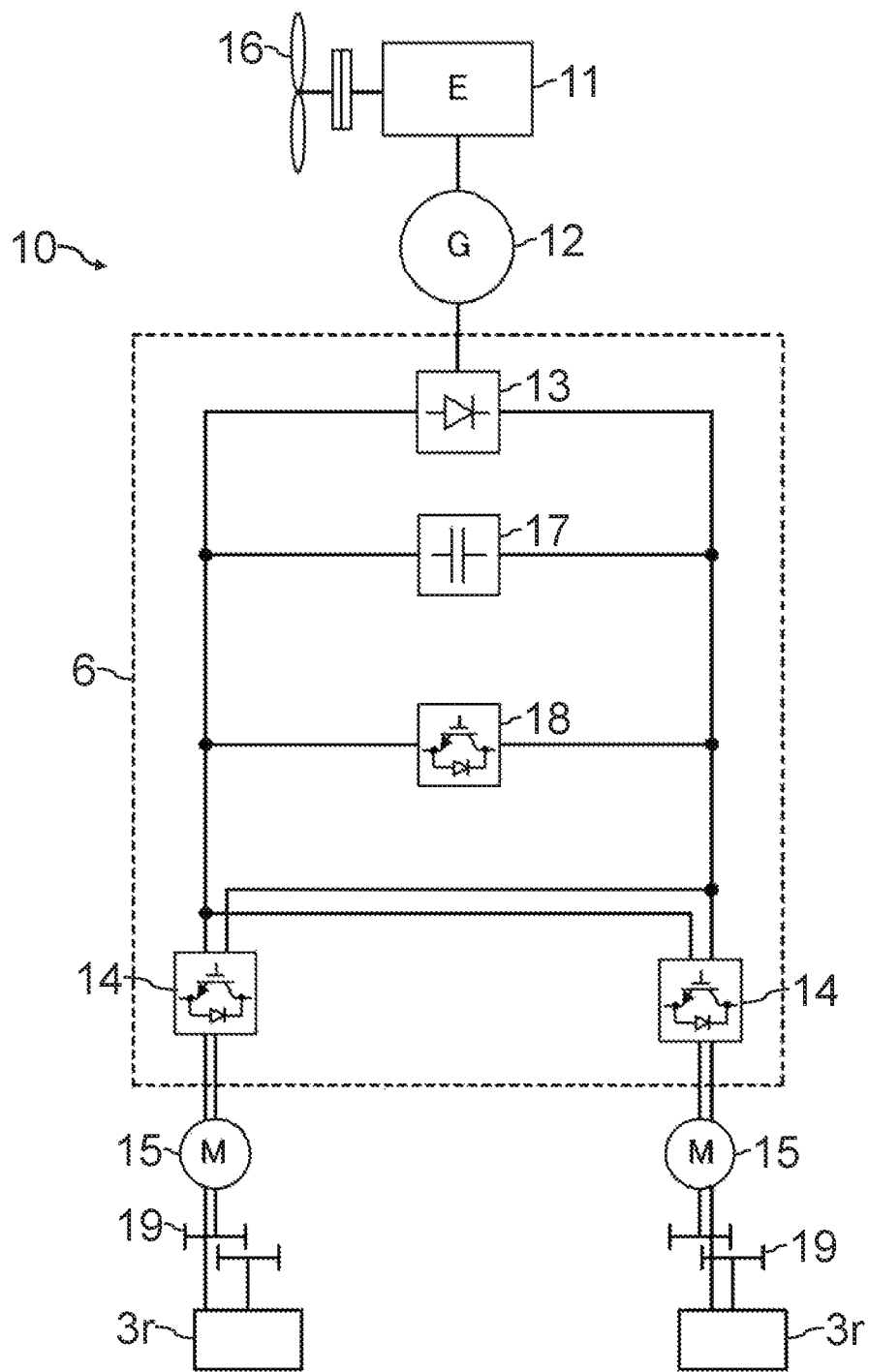
FIG. 2 is a schematic diagram of a power train provided to the dump truck shown in FIG. 1.

FIG. 2 is a schematic diagram of a power train provided to the dump truck shown in FIG. 1. In the figure, elements already described with reference to FIG. 1 are identified by the same reference numerals as in FIG. 1, and description thereof will be omitted.

The power train 10 shown in FIG. 2 is a system that transmits the power of a prime mover to the driving wheels. The power train 10 includes the prime mover 11, the generator 12, a rectifier 13, a left and a right inverter 14, a left and a right travelling electric motor 15, and the like.

The prime mover 11 is an engine (internal combustion engine). The prime mover 11 combusts an injected fuel, and converts the heat quantity of the fuel into mechanical engine output power (rotational power) to drive the generator 12, a cooling fan 16, and a hydraulic pump (not shown). When the operator operates an operation pedal disposed in the cab 5, a fuel injection amount corresponding to a pedal operation amount is injected in the prime mover 11, and the prime mover 11 rotates at a revolution speed corresponding to the fuel injection amount.

Incidentally, the above-described cooling fan 16 is a device that generates cooling air for cooling the prime mover 11 and the like. The cooling fan 16 is mechanically connected to the prime mover 11 via a clutch. The hydraulic pump is a hydraulic fluid source of a hydraulic actuator such as the hoist cylinder 9. The hydraulic pump is mechanically connected to the prime mover 11.

The generator 12 is mechanically connected to the prime mover 11. The generator 12 is driven by the prime mover 11, and converts the engine output power into three-phase alternating-current power. The power generated by the generator 12 serves mainly as the power source of the left and right travelling electric motors 15.

The rectifier 13 is an AC-DC converter that converts the alternating-current power generated by the generator 12 into direct-current power. The rectifier 13 is housed in the control cabinet 6 together with a capacitor 17, a chopper 18, and the left and right inverters 14. The rectifier 13 and the capacitor 17 have a unitized water-cooled structure. The rectifier 13 and the capacitor 17 rectify and smooth the three-phase alternating-current power from the generator 12, and convert the three-phase alternating-current power into direct-current power. The chopper 18 is interposed between the capacitor 17 and the inverters 14. The chopper 18 extracts regenerative power generated by the inverters 14.

The left and right inverters 14 are formed by using an IGBT (Insulated Gate Bipolar Transistor), which is a kind of semiconductor element and has a high withstand voltage. The left and right inverters 14 control the operation of the left and right travelling electric motors 15. The left inverter 14 is connected to the left travelling electric motor 15. The right inverter 14 is connected to the right travelling electric motor 15. When the accelerator pedal is depressed, the left and right inverters 14 convert the direct-current power from the rectifier 13 into three-phase alternating-current power corresponding to the request. When the brake pedal is depressed, the left and right inverters 14 rectify power generated by the left and right travelling electric motors 15.

The left and right travelling electric motors 15 are formed by a three-phase induction motor. When the accelerator pedal is depressed, the left and right travelling electric motors 15 are driven by the three-phase alternating-current power from the inverters 14, and convert the three-phase alternating-current power into mechanical motor output power (rotational power). The rotational power of the left and right travelling electric motors 15 is transmitted to the rear wheels 3r via the reduction gears 19. The vehicle body thereby travels. When the brake pedal is depressed, the travelling electric motors 15 generate electric power. The excess electric power generated by the travelling electric motors 15 is stored in the capacitor 17 through the inverters 14, or is dissipated.

Figure 3:
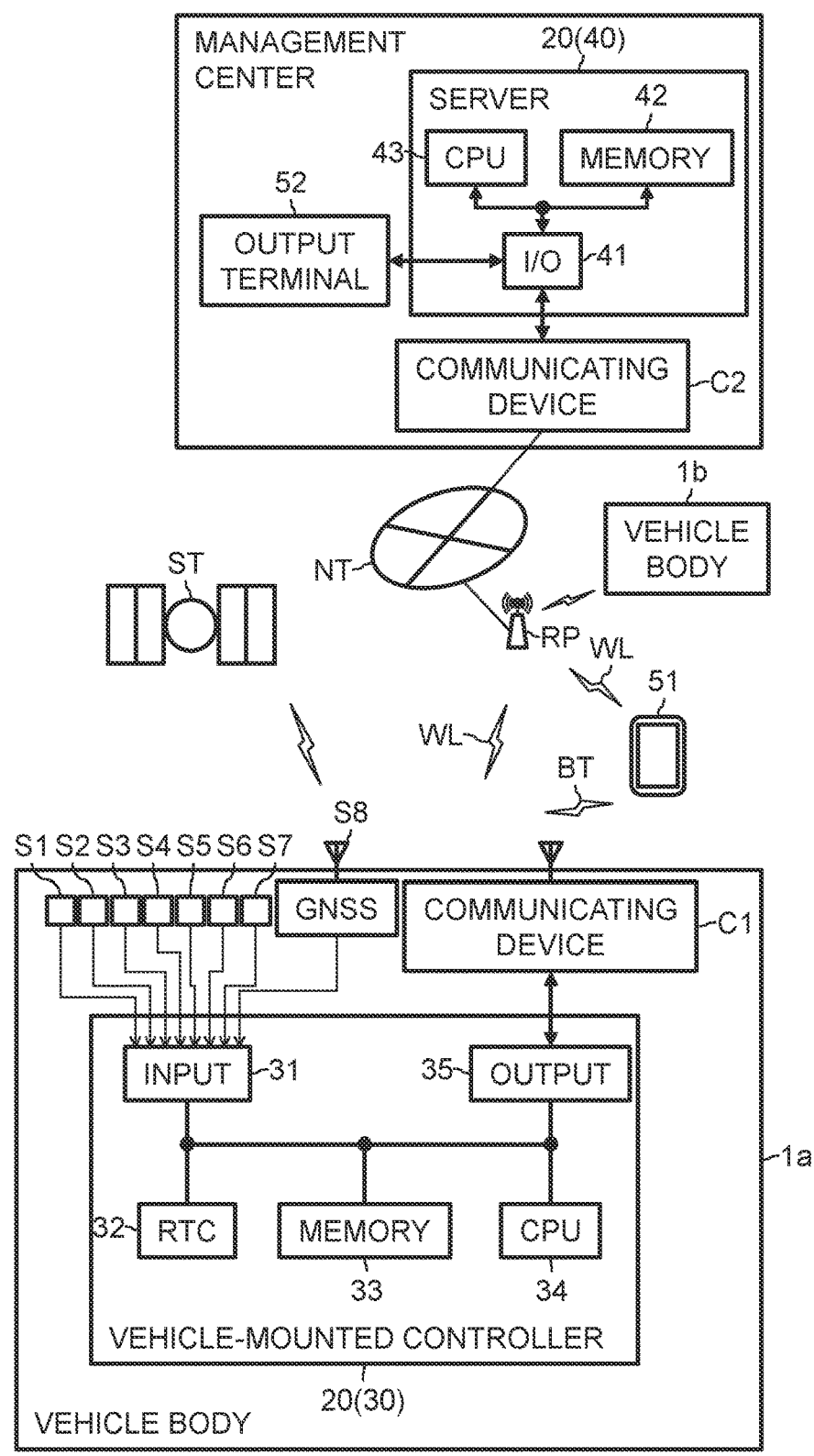
FIG. 3 is a schematic diagram of the vehicle body management system according to the first embodiment of the present invention.

Incidentally, the dump truck 1 includes sensors such as sensors S1 to S7 (FIG. 3) and a positioning device S8 (same figure). Signals of the sensors S1 to S7 and the positioning device S8 are output to the vehicle-mounted controller 30 (FIG. 3).

The sensor S1 is a fuel injection amount sensor that senses the fuel injection amount in the prime mover 11. A potentiometer that, for example, senses the operation amount of the operation pedal described above as a value corresponding to the fuel injection amount can be used as the sensor S1.

The sensor S2 is a prime mover output power sensor that senses the output power of the prime mover 11. Usable as this sensor S2 is, for example, a revolution speed sensor that senses the revolution speed of the prime mover 11 as a value corresponding to the prime mover output power or a torque sensor that senses the torque of the prime mover 11 as a value corresponding to the prime mover output power. The revolution speed sensor and the torque sensor can be provided to the output power shaft of the prime mover 11.

The sensor S3 is a direct-current power sensor that senses the direct-current power resulting from electric power generation in the generator 12 and direct current conversion in the rectifier 13. The sensor S4 is an alternating-current power sensor that senses the alternating-current power output from the inverters 14. A wattmeter, for example, can be used as these sensors.

The sensor S5 is a motor output power sensor that senses the output power of the travelling electric motors 15. Usable as this sensor S5 is, for example, a revolution speed sensor that senses the revolution speed of the travelling electric motors 15 as a value corresponding to the motor output power or a torque sensor that senses the torque of the travelling electric motors 15 as a value corresponding to the motor output power. The revolution speed sensor and the torque sensor can be provided to the output power shafts of the travelling electric motors 15.

The sensor S6 is a vehicle body inclination angle sensor that measures the inclination angle of the dump truck 1 with respect to a reference plane (for example, a horizontal plane). An acceleration sensor (IMU or the like), for example, can be used as the sensor S6. The sensor S7 is a loading amount sensor that measures a loading amount, that is, the weight of a cargo loaded on the cargo bed 8. A strain gage, for example, can be used as the sensor S7. The loading amount can be computed from an amount of deformation of the vehicle body frame 2, for example, due to the weight of the cargo or from a load applied to the axles of the front wheels 3f and the rear wheels 3r.

The positioning device S8 is, for example, a GNSS receiver. The positioning device S8 outputs antenna position data received from an artificial satellite ST (FIG. 3) to the vehicle-mounted controller 30. The vehicle-mounted controller 30 calculates the position of a reference point (for example, the center of gravity of the vehicle body) of the dump truck 1 in a terrestrial coordinate system (that may be an originally defined coordinate system) from an antenna position and known vehicle body dimension data of the dump truck 1.

—Vehicle Body Management System—

FIG. 3 is a schematic diagram of the vehicle body management system according to the first embodiment of the present invention. The vehicle body management system shown in the figure is a system that manages dump trucks 1a, 1b . . . . The vehicle body management system includes a processing device 20 and at least one output terminal (two output terminals are illustrated in the FIGS. 51 and 52. While two dump trucks 1a and 1b are illustrated in the figure, the vehicle body management system can also manage three or more dump trucks. The dump trucks 1a and 1b each correspond to the dump truck 1 described with reference to FIG. 1 and FIG. 2. The processing device 20 will be described in the following, and then the output terminals 51 and 52 will be described later in the section of "—Output Terminal—."

—Processing Device—

The processing device 20 includes at least one computer. The processing device 20 has a function of computing the efficiency value of a monitoring target (to be described later), which is the power train 10 of the dump truck 1a or 1b or a part or a subsystem of the power train 10. The processing device 20 computes the efficiency value on the basis of information (data) of the dump truck 1a or 1b, which is sensed by sensors (for example, the sensors S1 to S7) provided to the dump truck 1a or 1b. The processing device 20 in the present embodiment includes the vehicle-mounted controller 30 and the server 40. The vehicle-mounted controller 30 and the server 40 will be described later in the sections "—Vehicle-Mounted Controller—" and "—Server—," respectively.

Incidentally, the "monitoring target" is the power train 10 of each dump truck or an individual part or a subsystem of the power train 10. When a certain monitoring target is selected on an output terminal, for example, the data of the efficiency value of the selected monitoring target is downloaded from the processing device to the output terminal, and the data of the efficiency value of the monitoring target can be checked on the output terminal. In this case, it is possible to select the whole of the power train 10 as the monitoring target, select one part as the monitoring target, or select one subsystem as the monitoring target. In addition, the selection of the monitoring target whose efficiency value is to be checked can be changed sequentially. A configuration can be adopted in which a plurality of monitoring targets can be selected simultaneously.

The "part" is an individual device (mainly a device that converts energy) that constitutes the power train. In the example described with reference to FIG. 2, the prime mover 11, the generator 12, the rectifier 13, the inverters 14, the travelling electric motors 15, or the like corresponds to the part.

The "subsystem" is a system of a smaller unit than the power train, and includes a plurality of parts and constitutes a part of the power train. When the prime mover 11, the generator 12, the rectifier 13, the inverters 14, and the travelling electric motors 15 are regarded as a series of parts in the example of FIG. 2, "Prime Mover 11+Generator 12" and "Prime Mover 11+Generator+Rectifier 13," for example, are examples of the subsystem. In addition, "Generator 12+Rectifier 13," "Generator 12+Rectifier 13+Inverters 14," and "Generator 12+Rectifier 13+Inverters 14+Travelling Electric Motors 15" correspond to a subsystem including the generator 12. Further, "Rectifier 13+Inverters 14," "Rectifier 13+Inverters 14+Travelling Electric Motors 15," and "Inverters 14+Travelling Electric Motors 15" each also correspond to the subsystem.

The "efficiency value" is a ratio of output energy to input energy of the monitoring target, and is computed on the basis of the input energy and the output energy. As an example, the efficiency value can be computed by dividing the output energy by the input energy (percentage calculation may be performed). A higher efficiency value of the monitoring target means that the input energy is converted into the output energy at a higher ratio in the monitoring target. When the monitoring target has a certain abnormality, the efficiency value of the monitoring target is relatively lowered.

—Vehicle-Mounted Controller—

The vehicle-mounted controller 30 is a computer included in the dump truck 1a or 1b. The vehicle-mounted controller 30 mainly has a function of collecting data such as the efficiency value of the monitoring target of the dump truck in which the vehicle-mounted controller 30 itself is included. In the following, the vehicle-mounted controller 30 of the dump truck 1a will be described. However, the vehicle-mounted controllers of the other dump trucks have a similar configuration.

The vehicle-mounted controller 30 includes an input interface 31, an RTC (real-time clock) 32, a memory 33, a CPU 34, and an output interface 35.

Signals from the sensors included in the dump truck, the sensors being the sensors S1 to S7 and the positioning device S8 or the like, are input to the input interface 31. The various kinds of signals from the sensors are converted into a digital form as required, are computed as various kinds of input and output energy by the CPU 34, and are stored in the memory 33 as required.

The RTC 32 is a clock of the vehicle-mounted controller 30. The RTC 32 ticks time in units of 0.1 seconds, for example. The time ticked by the RTC 32 is, for example, added as time data to the above-described input and output energy or the like. In addition, also for a value (for example, the efficiency value of each monitoring target) computed by the CPU 34 on the basis of input and output energy in the vehicle-mounted controller 30, the time data of the input and output energy serving as a basis of the computation is handed over to and added to the value. A computed time may be added to the computed value.

The memory 33 is a storage device having a storage area that stores a program executed by the CPU 34, various values computed or sorted by the CPU 34, the times of the various values, and the like. Though not shown, the memory 33 includes a ROM and an HDD that store the program for the CPU 34 to perform computation and various kinds of values, a RAM serving as a work area when the CPU 34 executes the program, and the like.

Figure 15:
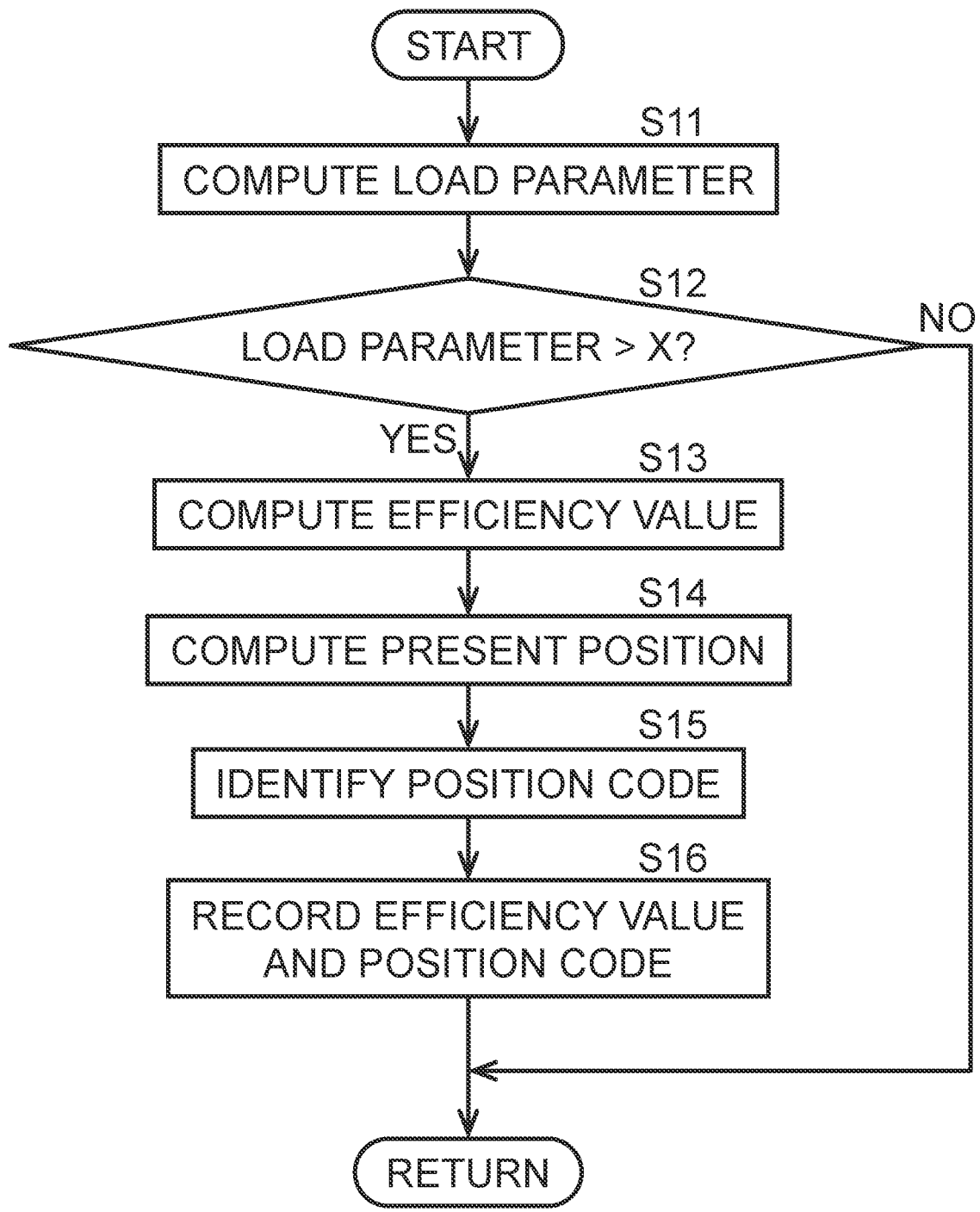
FIG. 15 is a flowchart showing an example of a procedure for computing the efficiency value of a monitoring target by a processing device provided to the vehicle body management system according to the first embodiment of the present invention.
Figure 16:
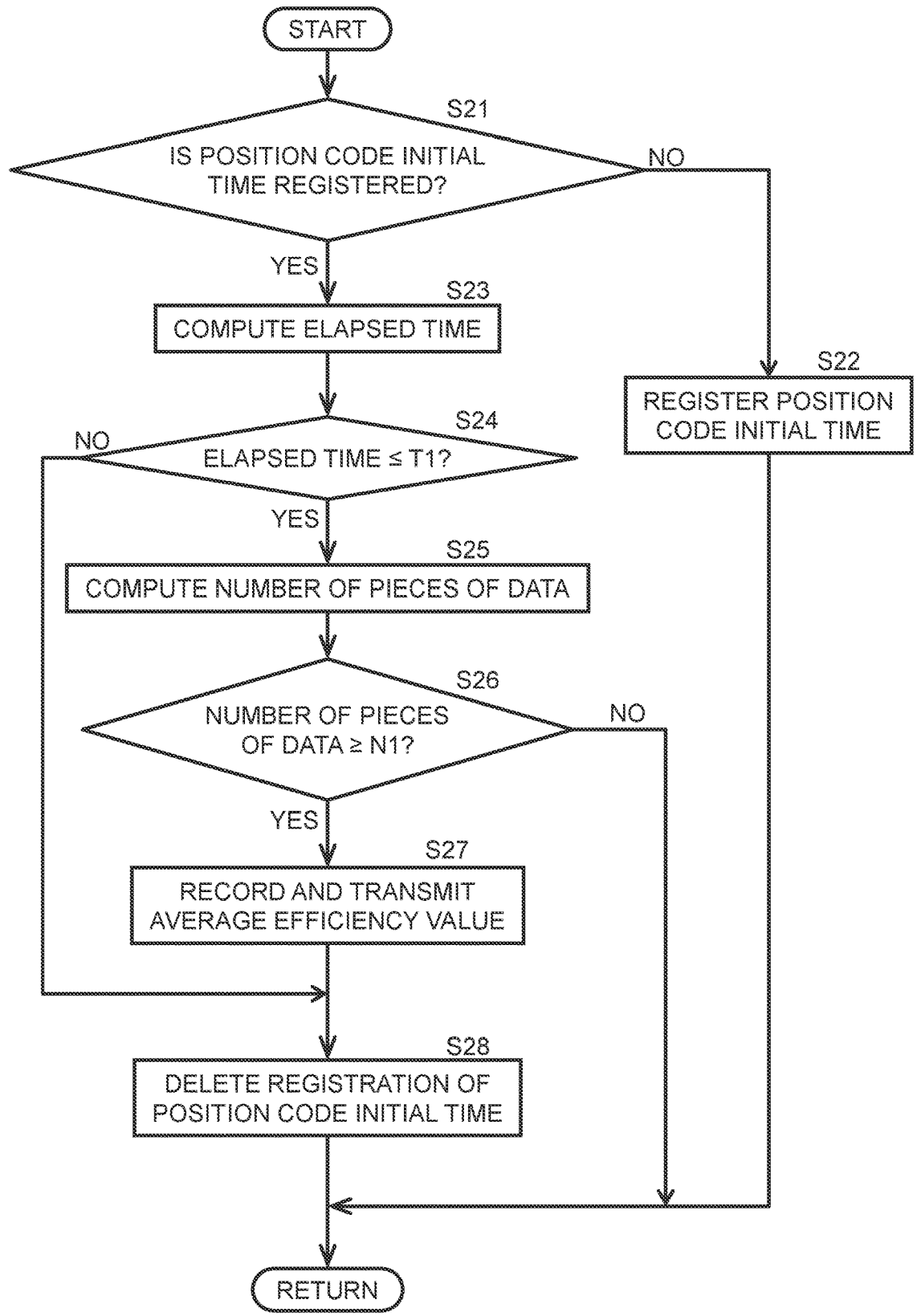
FIG. 16 is a flowchart showing an example of a procedure for sorting the efficiency value of the monitoring target by the processing device provided to the vehicle body management system according to the first embodiment of the present invention.

The CPU 34 has a role of performing various kinds of processing (computation of the input and output energy and the efficiency value of the monitoring target and the like, various kinds of determination, and the like) according to the program read from the memory 33 while the vehicle-mounted controller 30 is fed or during travelling of the dump truck, for example (FIG. 15 and FIG. 16).

The output interface 35 is a device that outputs data to another vehicle-mounted apparatus such as the above-described communicating device C1 or a monitor (not shown) within the cab 5. The data output from the output interface 35 to the communicating device C1 is transmitted to the server 40 via the communicating device C1, a wireless communication line (radio wave) WL, a nearest repeater RP, and a network NT. The repeater RP is a wireless LAN access point, a router, a base station, or the like. The network NT is, for example, the Internet. The communicating device C1 can also directly transmit and receive data to and from another apparatus such as the output terminal 51 via a radio medium BT without the intervention of the network NT. The radio medium BT is, for example, infrared radiation or a radio wave.

—Server—

The server 40 is a computer that has functions of taking statistics of the data of the efficiency value of each monitoring target of the dump trucks 1a, 1b . . . and determining an abnormality in each monitoring target. The server 40 is, for example, installed in a management center. The management center is, for example, a facility operated by a manufacturer of the dump truck 1a and the like. However, the management center may be a facility operated by a company or the like entrusted with management service from the manufacturer, a user, or a dealer of the dump trucks 1a and 1b. The server 40 includes an input-output interface 41, a memory 42, and a CPU 43 or the like.

The input-output interface 41 is a device that plays a role corresponding to the communicating device C1 of the dump truck. The input-output interface 41 transmits and receives data to and from a communicating device C2 and the output terminal 52 via wire communication, wireless communication, or a network such as a LAN or the like. The data of efficiency values from the dump trucks 1a, 1b . . . , which is received by the communicating device C2 via the network NT, is input to the server 40 via the input-output interface 41, and is recorded in the memory 42 (uploaded). When the server 40 is accessed from the output terminal 51, for example, the predetermined data recorded in the memory 42 is downloaded to the output terminal 51 via the input-output interface 41, the communicating device C2, the network NT, the repeater RP, and the wireless communication line WL.

The memory 42 is a storage device having a storage area that stores the program executed by the CPU 43, various data input to the server 40, data computed by the CPU 43, and the like. Though not shown, the memory 42 includes a ROM and an HDD storing the program for the CPU 43 to perform computation and various kinds of values, a RAM serving as a work area when the CPU 43 executes the program, and the like.

Figure 17:
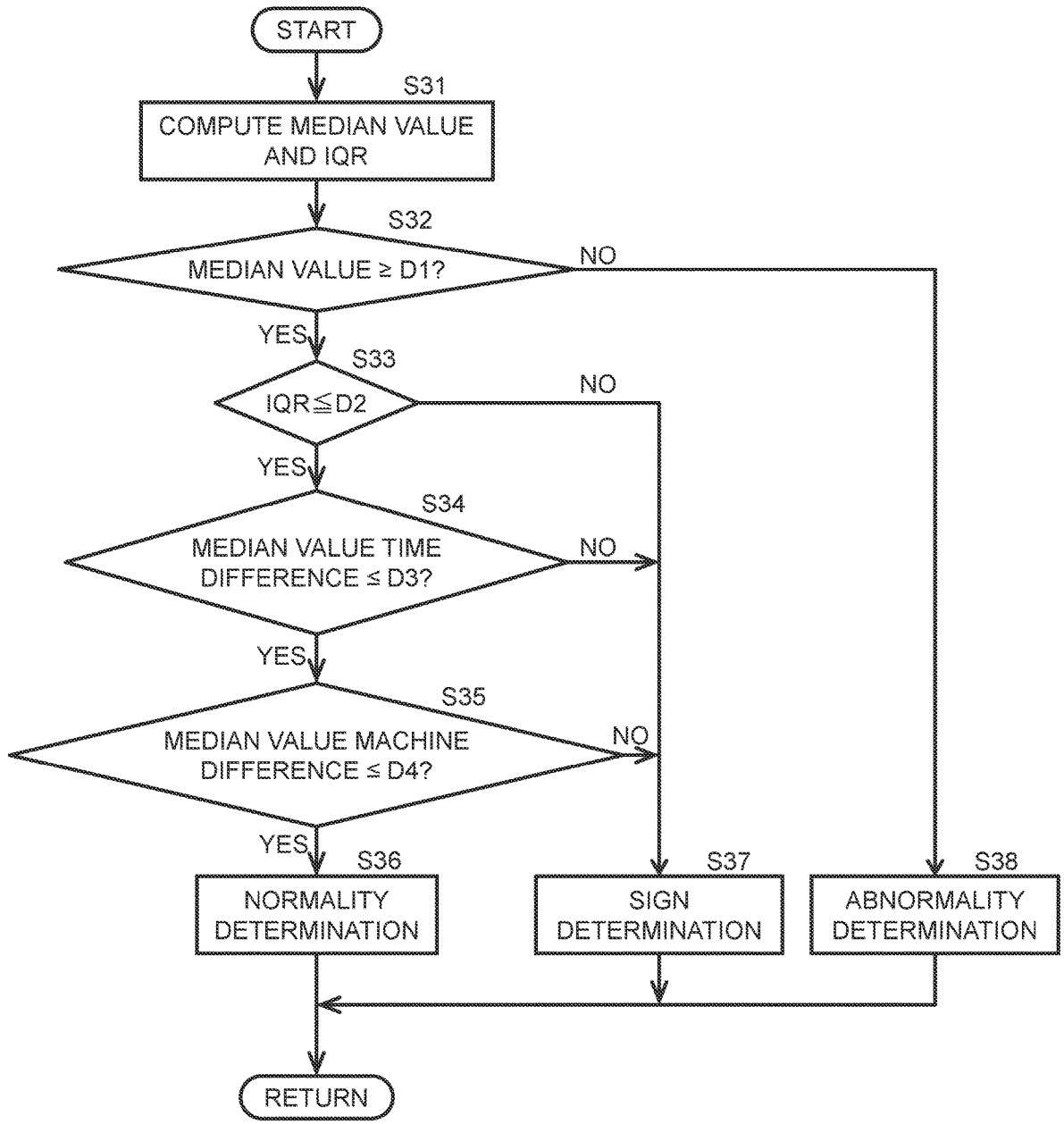
FIG. 17 is a flowchart showing an example of a procedure for determining an abnormality or a sign thereof in the monitoring target by the processing device provided to the vehicle body management system according to the first embodiment of the present invention.

According to the predetermined program stored in the memory 42, the CPU 43, for example, performs functions of taking statistics of the data of the efficiency value, which is collected by the vehicle-mounted controller 30, and determining whether the monitoring target is normal or has an abnormality on the basis of statistical data (FIG. 17).

—Output Terminal—

The output terminals 51 and 52 are terminals for performing output of display or the like of the efficiency value of the monitoring target, which is computed by the processing device 20, statistical data, a determination result, or the like so that, for example, a driver, a manager, or a serviceperson of the dump truck checks the efficiency value of the monitoring target, which is computed by the processing device 20, the statistical data, the determination result, or the like. The output terminal 51 is an example of a portable terminal having a display. The output terminal 51 is, for example, a smart phone, a tablet PC, or a notebook PC. The output terminal 52 is an example of a fixed terminal such as a printer or a desktop PC. Though not shown, an output terminal can be installed within the cab 5 of the dump truck so that the driver or the like can check the efficiency value of the monitoring target, which is computed by the processing device 20, the statistical data, the determination result, or the like within the cab. A monitor of the server 40 is also a kind of output terminal.

The output terminal 51 can access the server 40 via the nearest repeater RP and the network NT. The output terminal 51 is a mobile terminal, and is able to access the server 40 at any place as long as the output terminal 51 can receive the wireless communication line (radio wave) WL of the nearest repeater RP at the place. In addition, when the data of the dump truck 1*a* is to be checked, for example, and a distance between the output terminal 51 and the dump truck 1*a* is in a reaching range of the radio medium BT, the vehicle-mounted controller 30 can be accessed from the output terminal 51 without the intervention of the network NT. According to the output terminal 51, data downloaded from the server 40 or the vehicle-mounted controller 30 can be viewed on the display of the output terminal 51 by using a predetermined application installed on the output terminal 51. The display displays the data in a predetermined report format. In this case, a configuration can be adopted in which display data in the report format for efficiency values or the like is generated in the vehicle-mounted controller 30 and the server 40, and a report or data in a predetermined period of a specified dump truck is viewed on the output terminal 51. In addition, a configuration can be adopted in which data downloaded from the vehicle-mounted controller 30 and the server 40 is converted into the report format and displayed by an application on the output terminal 51.

The output terminal 52 can access the server 40 via a closed network such as a LAN within the management center in which the server 40 is installed, and the output terminal 52 can display data downloaded from the server 40 on a display and print the data. The display displays the data in the predetermined report format as in the case of the output terminal 51, and the data can also be printed. A configuration may be adopted in which the data downloaded from the server 40 is converted into the report format, displayed, and printed by an application on the output terminal 52.

Incidentally, while FIG. 3 illustrates a configuration in which the server 40 is accessed from the output terminal 52 installed within the management center via the closed network such as a LAN, the server 40 can be allowed to be accessed from another fixed terminal that can connect to the network NT.

—Efficiency Value Sorting Method—

When an abnormality occurs in a part of the power train, an energy loss of the part is increased, and the efficiency value is consequently decreased. Accordingly, an abnormality in the monitoring target can be determined by computing and monitoring the efficiency value of the monitoring target. In the example of FIG. 2, by calculating a ratio between optional two values among the fuel injection amount and the prime mover output power of the prime mover 11, the direct-current power output by the rectifier 13, inverter output power, and motor output power, for example, it is possible to compute the efficiency value of the monitoring target having these values as input and output energy. The vehicle-mounted controller 30 can compute the fuel injection amount from the signal of the sensor S1, the prime mover output power from the signal of the sensor S2, the direct-current power from the signal of the sensor S3, the inverter output power from the signal of the sensor S4, and the motor output power from the signal of the sensor S5.

Figure 4:
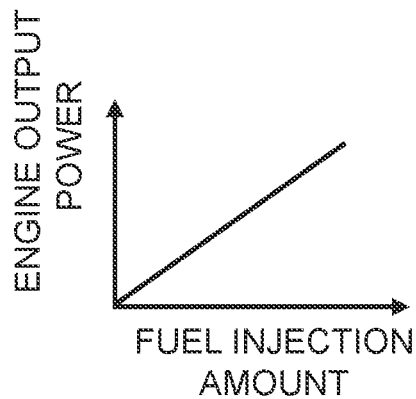
FIG. 4 is a diagram showing an example of a result of calculating the efficiency value of prime mover output power.
Figure 5:
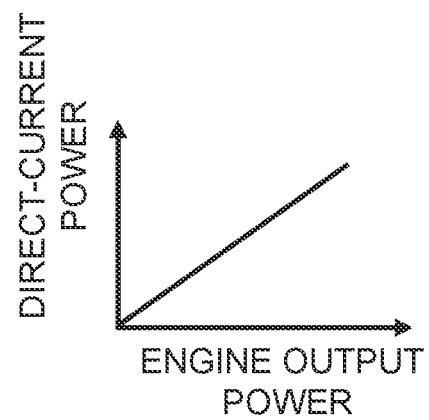
FIG. 5 is a diagram showing an example of a result of calculating the efficiency value of a subsystem formed by a generator and a rectifier.
Figure 6:
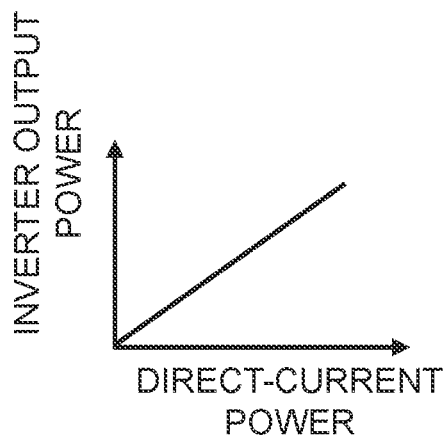
FIG. 6 is a diagram showing an example of a result of calculating the efficiency value of inverters.
Figure 7:
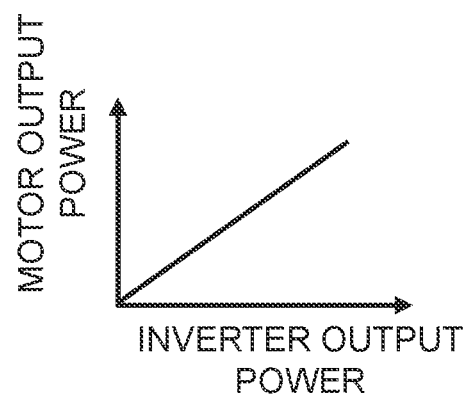
FIG. 7 is a diagram showing an example of a result of calculating the efficiency value of travelling electric motors.

For example, the efficiency value of the prime mover 11 can be computed on the basis of the prime mover output power (output energy) computed from the signal of the sensor S2 and the fuel injection amount (input energy) computed from the signal of the sensor S1. FIG. 4 shows an example of a result of calculating the efficiency value of the prime mover output power. Similarly, the efficiency value of the generator 12 (part) or the generator 12 and the rectifier 13 (subsystem) can be obtained from the signals of the sensors S2 and S3. FIG. 5 shows an example of a result of calculating the efficiency value of the subsystem formed by the generator 12 and the rectifier 13. The efficiency value of the inverters 14 can be obtained from the signals of the sensors S3 and S4. The efficiency value of the travelling electric motors 15 can be obtained from the signals of the sensors S4 and S5. FIG. 6 shows an example of a result of calculating the efficiency value of the inverters 14. FIG. 7 shows an example of a result of calculating the efficiency value of the travelling electric motors 15.

Besides, the efficiency value of the subsystem formed by the prime mover 11, the generator 12, and the rectifier 13 can be obtained from the signals of the sensors S1 and S3. The efficiency value of the subsystem to which the inverters 14 are further added can be obtained from the signals of the sensors S1 and S4. The efficiency value of the subsystem formed by the generator 12, the rectifier 13, and the inverters 14 can be obtained from the signals of the sensors S2 and S4. The efficiency value of the subsystem to which the travelling electric motors 15 are further added can be obtained from the signals of the sensors S2 and S5. The efficiency value of the subsystem formed by the inverters 14 and the travelling electric motors can be obtained from the signals of the sensors S3 and S5. The efficiency value of the whole of the power train can be obtained from the signals of the sensors S1 and S5.

As shown in FIGS. 4 to 7, the input energy and the output energy of the efficiency value of a normal monitoring target are substantially in proportional relation to each other. However, in the case of the prime mover 11, for example, the computation result of the efficiency value varies, affected by the revolution speed, boost pressure, exhaust temperature, cooling temperature, and the like of the prime mover 11. In addition, in the case of the subsystem of the generator 12 and the rectifier 13, the computation result of the efficiency value is affected by the travelling speed of the dump truck, a cooling pump, a travelling motor blower, an inverter blower, electric power generation efficiency, conversion efficiency, and the like. In the case of the inverters 14, the computation result of the efficiency value is affected by direct current conversion (chopper) and inverter temperature. In the case of the travelling electric motors 15, the computation result of the efficiency value is affected by travelling resistance (a road surface gradient and acceleration), motor temperature, and the like. Therefore, even when an instantaneous efficiency value of the monitoring target is computed from the input energy and the output energy at a certain time without consideration of a situation, the computed efficiency value cannot necessarily be said to be an appropriate value for evaluating the condition of the monitoring target.

Figure 8:
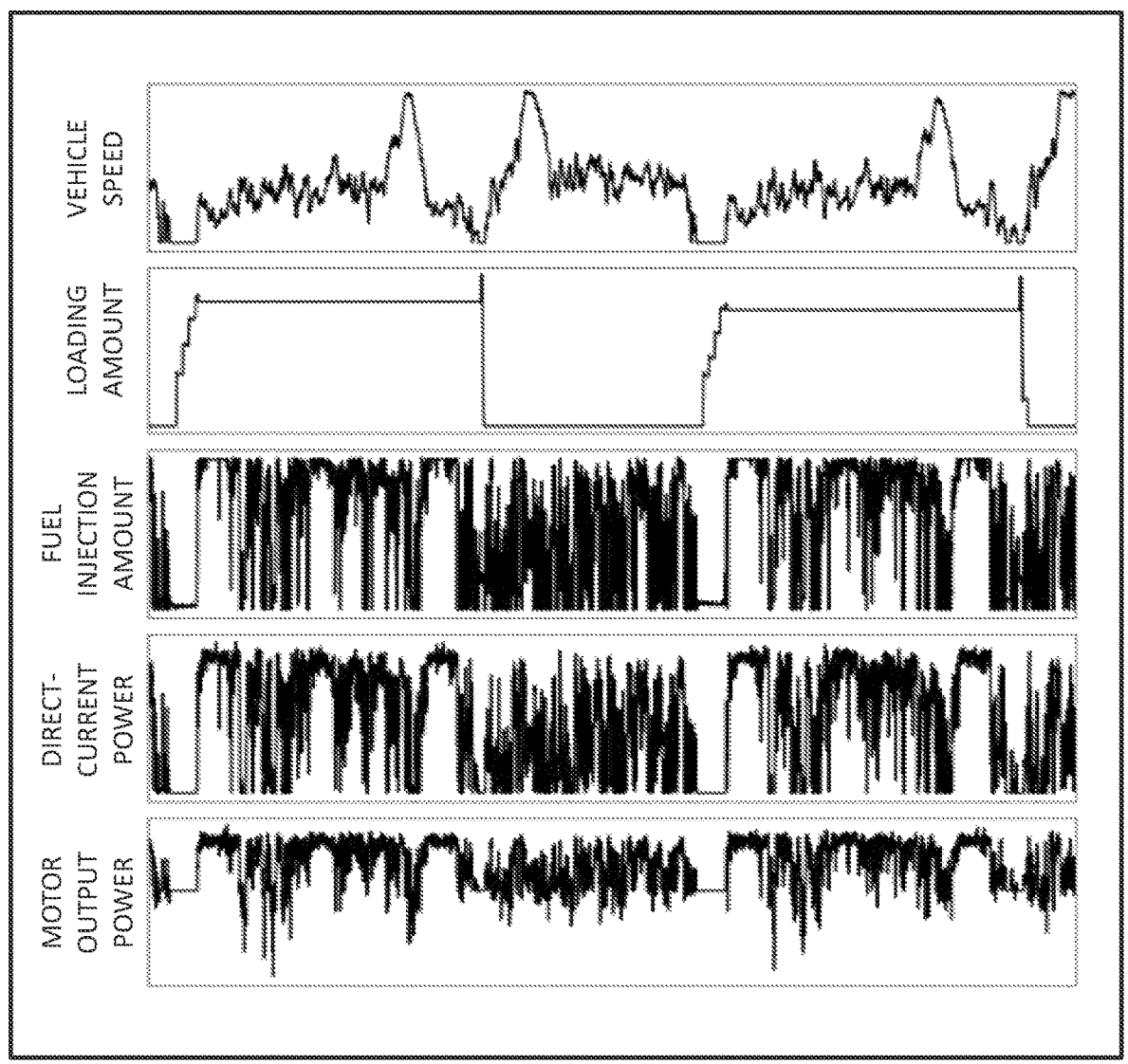
FIG. 8 is a diagram showing an example of data obtained as the dump truck travels.

FIG. 8 is an example of data obtained as the dump truck travels. The figure shows, from a top, a vehicle speed, the loading amount (weight of the cargo loaded on the cargo bed), the fuel injection amount, the direct-current power (output power of the rectifier), and the motor output power. Supposing that the data of FIG. 8 is obtained with regard to the power train 10 described with reference to FIG. 2, the efficiency value of the whole of the power train 10 can be computed when a ratio between the fuel injection amount (input energy) and the motor output power (output energy) is obtained on the basis of the data of FIG. 8. When a ratio between input and output energy is obtained by using the values of the fuel injection amount and the direct-current power, for example, the efficiency value of the subsystem formed by the generator 12 and the rectifier 13 or the prime mover 11 as a part can be computed. When a ratio between input and output energy is obtained by using the direct-current power and the motor output power, the efficiency value of the subsystem formed by the inverters 14 and the travelling electric motors 15 can be computed. While the efficiency value of an individual part (for example the prime mover 11) can of course be computed when necessary data is sensed, the efficiency value can also be computed in a subsystem unit thus combining a plurality of parts.

As will be described later, when whether the monitoring target is normal or has an abnormality is determined by the efficiency value of the monitoring target, it is important to compute the efficiency value used for the determination on the basis of data during operation under a high-load condition from a viewpoint of increasing the accuracy of a determination result. The high-load condition is a condition that the input energy to the prime mover be a predetermined value or more. In the example of FIG. 2 in which an engine is used as the prime mover 11, the fuel injection amount is typically a load parameter, and a condition that the fuel injection amount be at the predetermined value or more can be adopted as one high-load condition. The fuel injection amount in the present embodiment can be computed from an operation amount of the operation pedal (signal of the sensor S1). In a case where an automatic speed adjusting device is included, the fuel injection amount can be computed also from an engine control signal of the automatic speed adjusting device. In a case of a dump truck using an electric motor as the prime mover 11, electric power supplied to an electric motor (trolley electric power or the like) can be adopted as the load parameter.

In addition, the fuel injection amount or the supplied electric power tends to be increased at a time of travelling on a road surface having a rising gradient. From this viewpoint, the gradient of the travelling road surface can also be regarded as one of load parameters defining the high-load condition, and a condition that the rising gradient be a predetermined load determination value or more can be adopted as one high-load condition. The gradient of the travelling road surface can be computed from the signal of the sensor S6. An acceleration resistance can also be illustrated as a load parameter defining the high-load condition. In addition, directing attention to the loading amount in FIG. 8 shows that the fuel injection amount tends to be increased as a whole in a case where the loading amount is large as compared with a case where the loading amount is small. From this tendency, the loading amount can also be regarded as one of the load parameters defining the high-load condition, and a condition that the loading amount be a predetermined load determination value or more can be adopted as one high-load condition.

Figure 9:
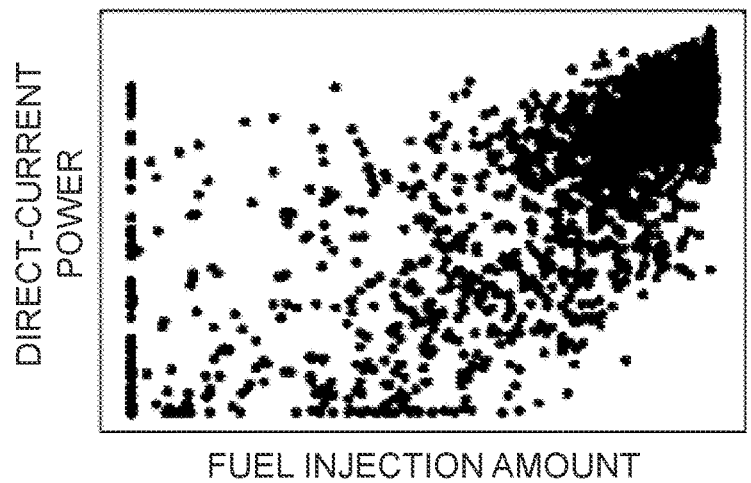
FIG. 9 is a diagram showing a result of extracting data obtained under a condition that a loading amount be larger than a predetermined value from the data of FIG. 8 with regard to the value of direct-current power with respect to a fuel injection amount.

FIG. 9 is a diagram showing a result of extracting data obtained under a condition that the loading amount be larger than a predetermined value from the data of FIG. 8 with regard to the value of the direct-current power with respect to the fuel injection amount. The efficiency value of the subsystem formed by the prime mover 11, the generator 12, and the rectifier 13 (which will be described simply as a subsystem in the following description with reference to FIGS. 9 to 12) can be expressed by Direct-Current Power/Fuel Injection Amount. Thus, the efficiency value of the subsystem can be computed for each piece of data of FIG. 9. However, variations due to various factors such as an operation state remain in the data extracted by filtering using only the loading amount as in FIG. 9. It is therefore difficult to determine whether the subsystem is normal or has an abnormality on the basis of the efficiency value computed from the data of FIG. 9.

Figure 10:
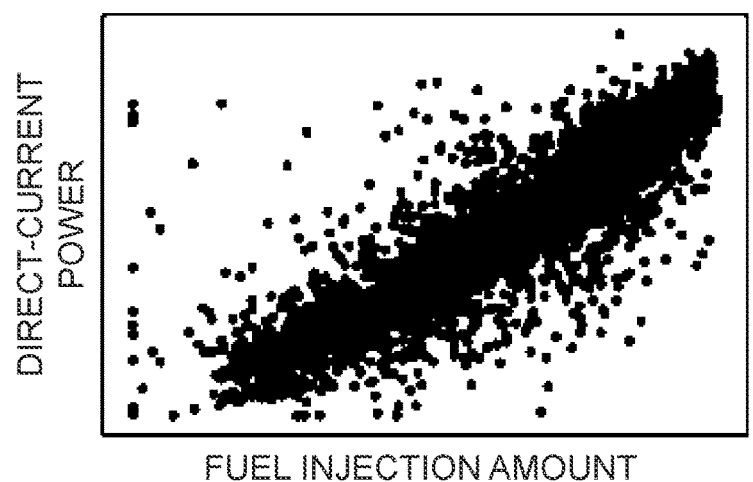
FIG. 10 is a diagram showing a result obtained by classifying each piece of data of FIG. 9 by accompanying position and time data, and calculating an average value in each classification with regard to the value of the direct-current power with respect to the fuel injection amount.

FIG. 10 is a diagram showing a result obtained by classifying each piece of data of FIG. 9 by accompanying position and time data, and calculating an average value in each classification with regard to the value of the direct-current power with respect to the fuel injection amount. Each point plotted in FIG. 10 represents average direct-current power with respect to an average fuel injection amount computed on the basis of data in a same time period and a same travelling area. With regard to the travelling area, the data can be classified by, for example, dividing a position coordinate system by meshes (for example, 30 m×30 m), and determining to which mesh the accompanying position data belongs. With regard to the time period, the data can be classified by demarcating each predetermined time, and determining in which time period (time classification) the data is obtained. A comparison of FIG. 10 with FIG. 9 indicates that although variations in the data of the efficiency value are decreased in FIG. 10 as compared with FIG. 9, it is difficult to determine with high accuracy whether the subsystem is normal or abnormal.

Figure 11:
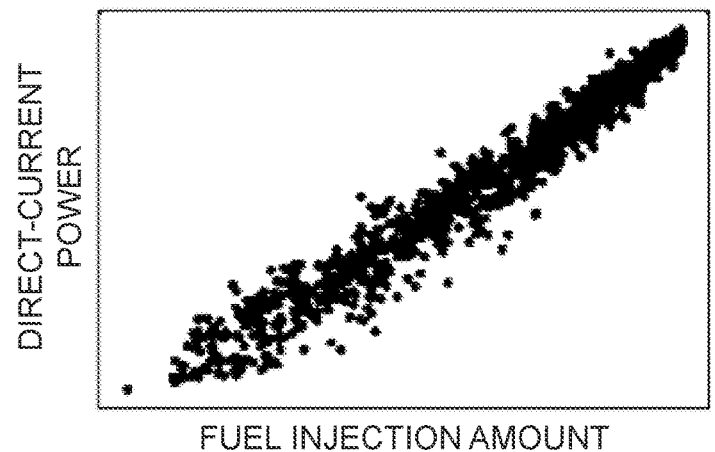
FIG. 11 is a diagram showing a result of extracting data whose number of pieces of basic data for average value calculation is equal to or more than a predetermined value from the data shown in FIG. 10.

FIG. 11 is a diagram showing a result of extracting data whose number of pieces of basic data for average value calculation is equal to or more than a predetermined value from the data shown in FIG. 10. That is, FIG. 11 is obtained by excluding average values whose number of pieces of data is less than the predetermined value from FIG. 10. In FIG. 11, variations in the data are reduced greatly. Variations in data due to disturbances such as a travelling environment and driving skills are suppressed in the example of thus classifying, by travelling area and time period, the data roughly sorted under the high-load condition related to the loading amount, obtaining an average value in each classification, and extracting data whose number of pieces of basic data is large.

Figure 12:
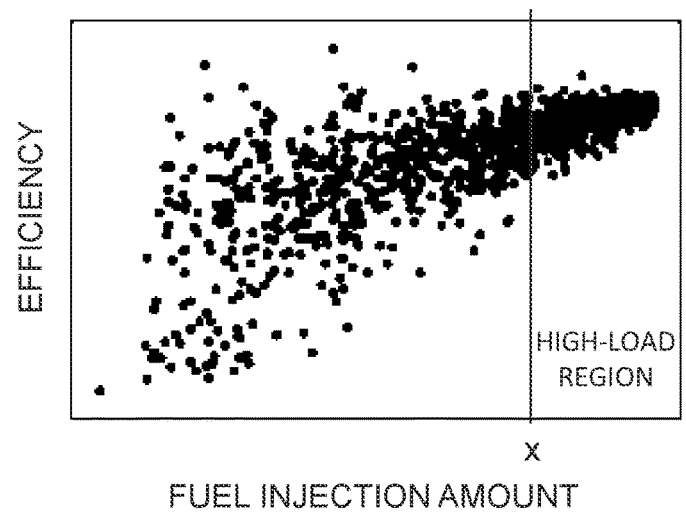
FIG. 12 is a diagram showing data obtained by converting FIG. 11 into relation between the fuel injection amount and the efficiency value (KPI).

FIG. 12 is a diagram showing data obtained by converting FIG. 11 into relation between the fuel injection amount and the efficiency value (KPI). As can be recognized in FIG. 12, variations in the computed efficiency value are smaller in a high-load region where the fuel injection amount is large. A conceivable reason for this is that in the high-load region, variations in engine speed and boost pressure are small as compared with a low-load region, and energy consumed by auxiliary equipment such as the cooling pump and the motor blower is low as compared with the low-load region. In FIG. 12, suppose, for example, that a region in which variations in the efficiency value are equal to or smaller than a predetermined allowable value is a region in which the fuel injection amount is larger than X. In this case, the validity of the determination as to whether the monitoring target is normal or has an abnormality is improved by storing the load determination value X set in advance for the fuel injection amount in the memory 33 in advance, and evaluating a robust efficiency value in the high-load region in which the fuel injection amount is larger than the load determination value X.

Incidentally, the data of FIG. 12 has been filtered by the loading amount in advance (FIG. 9), and therefore the extraction of values whose fuel injection amount is equal to or larger than the load determination value X is filtering related to a second high-load condition. However, when an increase in the number of pieces of data can be tolerated, either of filtering by the loading amount and filtering by the fuel injection amount (for example, the former) may be omitted, and data may be extracted under one high-load condition. Conversely, the data can be further narrowed down under three or more high-load conditions.

—Abnormality Determining Method—

Figure 13:
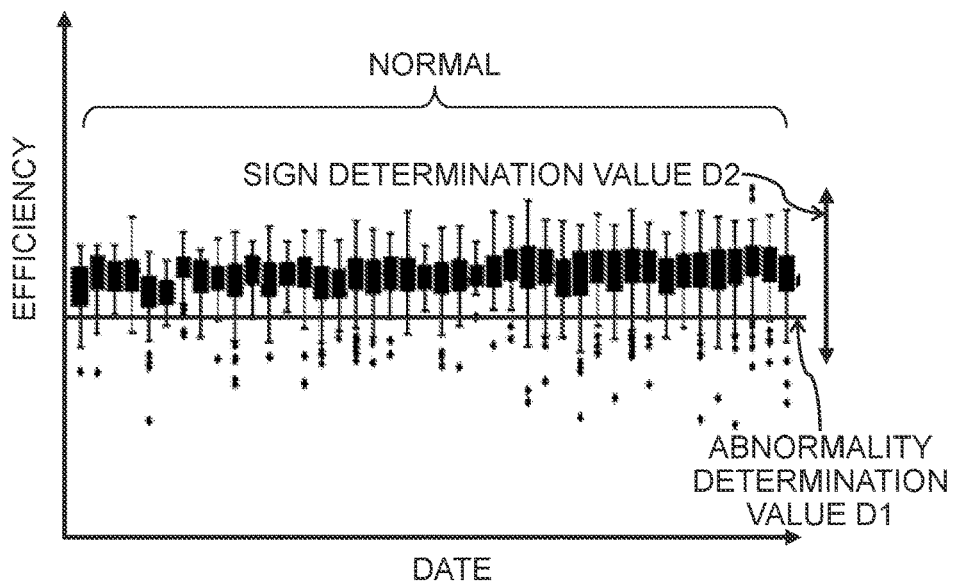
FIG. 13 is a diagram showing an example of a box plot of the efficiency value when the power train is normal.
Figure 14:
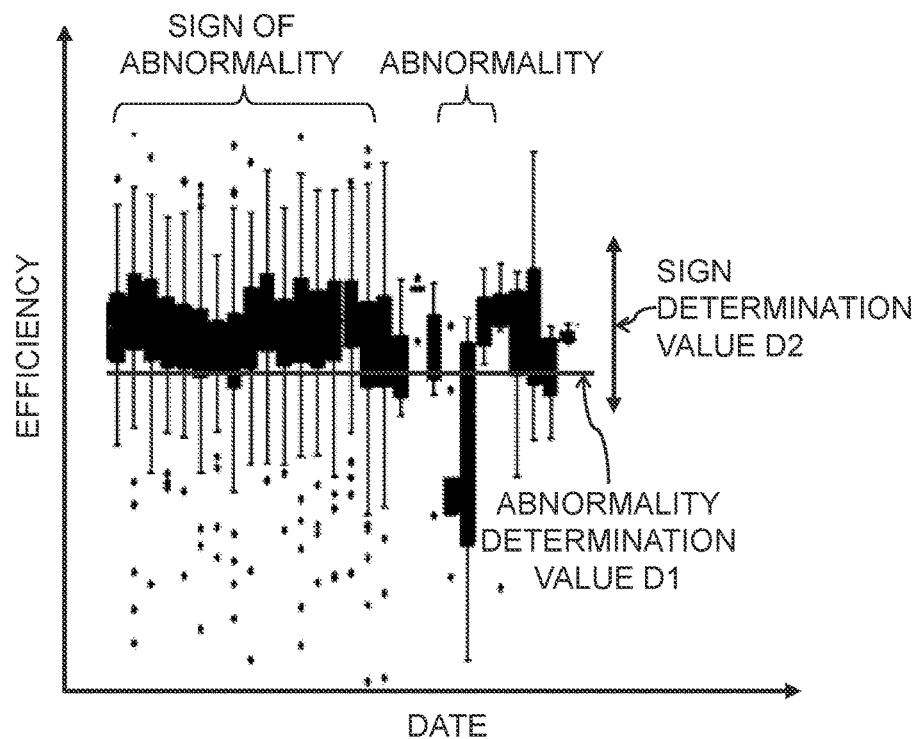
FIG. 14 is a diagram showing an example of a box plot of the efficiency value when an abnormality occurs in the power train.

FIG. 13 is an example of a box plot of the efficiency value when the power train is normal. FIG. 14 is an example of a box plot of the efficiency value when an abnormality occurs in the power train. In these diagrams, an axis of abscissas indicates date, and an axis of ordinates indicates the efficiency value. A quartile range and a median value are computed as statistics of the efficiency value per day for one monitoring target of one dump truck. In a case where determination values for determining whether the monitoring target is abnormal or normal are set on the basis of the efficiency value in the vehicle body management system of FIG. 3, statistics of the data of FIG. 12 are taken for a required period for each monitoring target during a normal time of the power train 10, for example, and the data of FIG. 13 for the required period is generated on the basis of the statistics. Then, for each monitoring target, on the basis of the data, an abnormality determination value D1 for determining the occurrence of an abnormality and a sign determination value D2 for determining a sign of an abnormality are set in advance, and are stored in at least the memory 42 of the memories 33 and 42 (FIG. 3).

As the abnormality determination value D1, as shown in FIG. 13, a value can, for example, be set which is obtained by providing a predetermined small margin for a minimum value of a first quartile point of the quartile range (value at a lower end of each box) of the efficiency value per day in a predetermined period. In addition, a value obtained by providing a predetermined small margin for a minimum value of a median value (second quartile point) of the efficiency value per day in the predetermined period may be set as the abnormality determination value D1. The CPU 43 (or the CPU 34) computes the quartile range for the efficiency value of the monitoring target. When the median value of the efficiency value of a certain monitoring target has fallen below the abnormality determination value D1, as shown in FIG. 14, it can be determined that an abnormality has occurred in the monitoring target.

As the sign determination value D2, as shown in FIG. 13, a value can be set which is obtained by providing a predetermined large margin for a difference between a maximum value and a minimum value of the quartile range (the length of a whisker, that is, the magnitude of variation) of the efficiency value per day in the predetermined period. For example, the CPU 43 (or the CPU 34) computes the quartile range for the efficiency value of the monitoring target. Then, when the difference between the maximum value and the minimum value of the quartile range of the monitoring target, that is, the magnitude of variation of the data exceeds the sign determination value D2 as in FIG. 14, it can be determined that there is a sign of the occurrence of an abnormality in the monitoring target.

It is also possible to compare statistical data of the efficiency value in different time periods (for example, a designated day and a previous day) with regard to a same dump truck, and determine that an abnormality or a sign of the abnormality has occurred in the power train when these pieces of statistical data change so as to exceed a determination value D3 set in advance. The determination value D3 is stored in at least the memory 42 of the memories 33 and 42 (FIG. 3) in advance. In a case where the condition of the monitoring target is determined by using the determination value D3, the statistical data of the efficiency value computed for each monitoring target is accumulated in at least the memory 42 of the memories 33 and 42. For example, the CPU 43 (or the CPU 34) computes a difference between newly computed statistical data of the efficiency value for a predetermined period (for example, one day) and the statistical data of the efficiency value for a predetermined period in the past (for example, for the previous day), the statistical data being stored in the memory, with regard to a certain monitoring target of the same dump truck. When the magnitude of this difference is larger than the determination value D3 read from the memory, it can be determined that there is an abnormality or a sign of an abnormality in the monitoring target. Median values can be cited as one example of the statistical data to be compared. However, differences between maximum values and minimum values of quartile ranges may be compared with each other. The determination value D3 may be set large when an abnormality is determined, and the determination value D3 may be set small when a sign is determined. Two large and small determination values D3 may be set to distinguish the abnormality and the sign from each other.

It is also possible to compare pieces of statistical data of the efficiency value obtained when a plurality of different dump trucks travel in a same travelling area in a same time period, and determine that an abnormality or a sign thereof has occurred in the power train when a difference between these pieces of statistical data is larger than a determination value D4 set in advance. The determination value D4 is stored in advance in at least the memory 42 of the memories 33 and 42 (FIG. 3). Description will be made of a case of determining an abnormality or a sign thereof in the power train of the dump truck 1a by taking as an example a situation in which the dump trucks 1a and 1b of FIG. 3 travel within a same site in a same time period. In this case, the statistical data of the efficiency value of a certain monitoring target for a predetermined period (for example, one day), the statistical data being obtained when the dump truck 1a travels, is compared with the statistical data of the efficiency value of a certain monitoring target, the statistical data being obtained when the dump truck 1b travels within the same site in the same time period (for example the same day). The statistical values of the efficiency value with regard to the dump trucks 1a and 1b can be compared with each other on the basis of the data stored in the memory 42. When statistical data Za of the efficiency value with regard to the dump truck 1a is smaller by more than the determination value D4 than statistical data Zb of the efficiency value with regard to the dump truck 1b (Zb>Za+D4), it can be determined that there is an abnormality or a sign of an abnormality in the monitoring target of the dump truck 1a. Median values can be cited as one example of the statistical data to be compared. However, differences between maximum values and minimum values of quartile ranges may be compared with each other. As with the determination value D3, the determination value D4 may be set large when an abnormality is determined, and the determination value D4 may be set small when a sign is determined. Two large and small determination values D4 may be set to distinguish the abnormality and the sign from each other.

Incidentally, the statistical data of the dump truck 1a can be compared with the statistical data of a plurality of other dump trucks travelling in the same region in the same time period. In this case, a representative value (for example, an average value, a median value, or a maximum value) of the statistical data of the plurality of other dump trucks may be computed and compared with the statistical data of the dump truck 1a.

—Efficiency Value Computation Processing—

FIG. 15 is a flowchart showing an example of a procedure for computing the efficiency value of the monitoring target by the processing device. While electric power is supplied to the vehicle-mounted controller 30, or while the dump truck in which the vehicle-mounted controller 30 itself is included travels, the vehicle-mounted controller 30 reads the program stored in the memory 33 and repeatedly performs the flows of FIG. 15 and FIG. 16 by the CPU 34 in cycles of 0.1 seconds. When the processing of FIG. 15 is performed, the efficiency value of each monitoring target under the high-load condition is computed, and is recorded in the memory 33 together with a position code (to be described later).

Step S11

When the vehicle-mounted controller 30 starts the flow of FIG. 15, the vehicle-mounted controller 30 in step S11 is supplied with signals of the sensors S1 to S7 and the positioning device S8, and computes at least one kind of present load parameter of the power train 10 by the CPU 34 in real time on the basis of the input signals. "Present" means a present processing cycle (that is, a processing cycle this time). The load parameter computed here is a value for determining the above-described high-load condition, and is, for example, the fuel injection amount of the prime mover 11, the loading amount of the cargo, or the road surface gradient. The fuel injection amount can be computed from the signal of the sensor S1. The loading amount can be computed from the signal of the sensor S7. The road surface gradient can be computed from the signal of the sensor S6.

Step S12

In the following step S12, the vehicle-mounted controller 30 determines by the CPU 34 whether the load parameter computed in step S11 is larger than the defined load determination value X read from the memory 33. When the load parameter is larger than the load determination value X, the vehicle-mounted controller 30 shifts the procedure from step S12 to step S13. When the load parameter is equal to or less than the load determination value X, the vehicle-mounted controller 30 ends the present processing cycle of the flow of FIG. 15, and shifts the procedure to a next processing cycle.

Incidentally, in a case where a plurality of kinds of load parameters are computed in step S11, programming can be performed such that the determination in step S12 is satisfied when all of the load parameters are larger than respective load determination values X, for example. The determination in step S12 may be satisfied when one of the load parameters is larger than the load determination value X of the load parameter. In a case where three kinds of load parameters or more are computed, the determination in step S12 may be satisfied when half of the load parameters or more or a predetermined number of load parameters are larger than the respective load determination values X. It suffices to determine such a determination condition in consideration of a computation load on the processing device 20 and the like.

Step S13

When the vehicle-mounted controller 30 shifts the procedure to step S13, the vehicle-mounted controller 30 computes an efficiency value of each monitoring target by obtaining a ratio between input energy and output energy of each monitoring target (for example, dividing the output energy by the input energy). The efficiency calculation may be computed by matching with an efficiency function (a straight line, a low-order curve, or the like) set in advance by a least-square method. The efficiency value of the monitoring target is computed on condition that the load parameter be larger than the load determination value X, and the computation of the efficiency value is omitted while the load parameter is equal to or less than the load determination value X. The input energy and the output energy are computed on the basis of the signals input from the sensors S1 to S7 to the vehicle-mounted controller 30 in step S11 of the present processing cycle, and data on the time measured by the RTC 32 at a time of the signal input is added.

Step S14

In the following step S14, the vehicle-mounted controller 30 computes the present position of the dump truck (own vehicle in which the vehicle-mounted controller 30 is included) by the CPU 34 on the basis of the reception data of the positioning device S8, which is input in step S11. The vehicle-mounted controller 30 adds the present position to the efficiency value computed in step S13. The position computed in this step may be a value in an ordinary terrestrial coordinate system, or may be a value in an xy coordinate system defined originally. In addition, instead of computing the present position from the reception data of the positioning device S8, it is possible to compute the present position by, for example, processing an image of a vehicle-mounted camera of the dump truck, and comparing the image with a database of each location (photographed image database or the like). The present position may be computed from a travelling trajectory identified on the basis of a travelling distance measured by an odometer and a steering history.

Step S15

In the following step S15, the vehicle-mounted controller 30 identifies a mesh to which the present position of the dump truck belongs, and identifies a position code of the identified mesh. The position code of the mesh may be a position code defined originally, or may be an ordinary position code such as a geohash (Geohash). The mesh defines a travelling region of a certain extent in the position coordinate system, and is a region corresponding to a region of 30 m×30 m on an actual ground surface, for example. Position codes are data assigned to respective meshes, and a mesh, that is, a travelling region can be identified by a position code.

Step S16

In the following step S16, the vehicle-mounted controller 30 records a data set of various kinds of efficiency values computed in step S13 and the position code and the time added thereto in the memory 33. When the vehicle-mounted controller 30 ends the procedure of step S16, the vehicle-mounted controller 30 ends the present processing cycle of the flow of FIG. 15, and shifts the procedure to a next processing cycle. The vehicle-mounted controller 30 thus computes the data of the efficiency value of each monitoring target, and sequentially records the data in the memory 33.
—Efficiency Value Sorting Processing—
FIG. 16 is a flowchart showing an example of a procedure for sorting the efficiency value of the monitoring target by the processing device. The processing of this flowchart is performed by the vehicle-mounted controller 30 each time the efficiency value is newly recorded in step S16 in FIG. 15, for example.

Step S21

When the vehicle-mounted controller 30 starts the flow of FIG. 16, the vehicle-mounted controller 30 identifies the position code accompanying the latest efficiency value recorded in the memory 33, and determines whether an initial time is registered in the memory 33 for the identified position code. This initial time is a starting time of a time limit set for data counting in each region (mesh). When the initial time is registered for the position code of the efficiency value, the vehicle-mounted controller 30 shifts the procedure from step S21 to step S23. When the initial time is not registered, the vehicle-mounted controller 30 shifts the procedure from step S21 to step S22.

Step S22

When the vehicle-mounted controller 30 shifts the procedure to step S22, the vehicle-mounted controller 30 registers the initial time in the memory 33 for the position code identified in step S21, ends the present processing cycle, and shifts the procedure to a next processing cycle. Usable as the initial time registered in step S22 is the time added to the efficiency value for which the presence or absence of the initial time is determined in step S21 of the present processing cycle. When the initial time is thus registered, the determination in step S21 is satisfied in the next and subsequent processing cycles while efficiency values having a common position code subsequently continue. An opportunity to perform step S22 next time arrives when the position code of the received efficiency value is changed, or when a set time T1 passes from the registered initial time, or when the number of pieces of data of the efficiency value of the present position code reaches a set number of pieces of data N1. The set time T1 and the set number of pieces of data N1 are values set in advance and recorded in the memory 33.

Step S23

When the vehicle-mounted controller 30 shifts the procedure to step S23, the CPU 34 of the vehicle-mounted controller 30 computes an elapsed time started from the initial time currently registered in the memory 33 for the efficiency value for which the registration of the initial time is confirmed in step S21 of the present processing cycle. The elapsed time can be computed by obtaining a difference between a present time and the initial time. Usable as the present time referred to here is, for example, the time accompanying the efficiency value confirmed to have the position code for which the initial time is currently registered in step S21 of the present processing cycle. Alternatively, the present time measured by the RTC 32 in real time can also be used.

Step S24

In the following step S24, the CPU 34 of the vehicle-mounted controller 30 reads the set time T1 set in advance from the memory 33 and determines whether the elapsed time computed in step S23 is equal to or less than the set time T1. When the elapsed time exceeds the set time T1 as a result of the determination, the vehicle-mounted controller 30 shifts the procedure from step S24 to step S28. When the elapsed time is equal to or less than the set time T1, the vehicle-mounted controller 30 shifts the procedure from step S24 to step S25.

Step S25

When the vehicle-mounted controller 30 shifts the procedure to step S25, the CPU 34 of the vehicle-mounted controller 30 computes the number of pieces of data of the efficiency value for the present position code, the data being recorded after the initial time currently registered in the memory 33.

Step S26

In the following step S26, the CPU 34 of the vehicle-mounted controller 30 reads the set number of pieces of data N1, which is set in advance from the memory 33, and determines whether the number of pieces of data, which is computed in step S25, is equal to or more than the set number of pieces of data N1. When the number of pieces of data does not reach the set number of pieces of data N1 as a result of the determination, the vehicle-mounted controller 30 ends the present processing cycle of the flow of FIG. 16, and shifts the procedure to a next processing cycle. When the number of pieces of data has reached the set number of pieces of data N1, the vehicle-mounted controller 30 shifts the procedure from step S26 to step S27.

Step S27

When the vehicle-mounted controller 30 shifts the procedure to step S27, the CPU 34 of the vehicle-mounted controller 30 computes an average value of N1 efficiency values for the same position code, which are accumulated within the set time T1 from the initial time. When the efficiency values are thus classified by the position of the dump truck, and the elapsed time from the initial time is measured, only the efficiency values that are equal to or more than the set number of pieces of data N1 and are collected within the set time T1 for a certain region (mesh) are extracted as valid data, and the average efficiency value of these efficiency values is computed. The computed average efficiency value is recorded in the memory 33 together with data on the position code and the time period, and a data set thereof is transmitted to the server 40 sequentially or at fixed time intervals. In addition, the data set recorded in the memory 33 can also be downloaded to the output terminal 51 via the radio medium BT, and viewed on the output terminal 51, as described with reference to FIG. 3.

When there are a plurality of dump trucks managed by the server 40, a data set obtained by adding a vehicle body ID to the average efficiency value, the position code, and the time period is transmitted from the vehicle-mounted controller 30 of each dump truck.

Incidentally, the set time T1 and the set number of pieces of data N1 can, for example, be set by assuming standard values for the gradient of the travelling road surface and the travelling speed at a time of travelling on the gradient in addition to the size (length of one side of a square) of a mesh and a sampling cycle. For example, when a sampling cycle of 0.1 seconds, a mesh size of 30 m, and a situation of travelling at 5 m/s on a standard rising gradient are assumed, the set time T1 can be set at 6 seconds from a time of travelling for 30 m, and the set number of pieces of data N1 can be set at 60 from the number of samplings during the period. When the set time T1 and the set number of pieces of data N1 are thus determined, the data of the efficiency value computed when the dump truck slightly crosses a mesh is excluded, and consequently data variations are suppressed.

Step S28

After the computation of the average efficiency value and the like in step S27, the vehicle-mounted controller 30 shifts the procedure to step S28, where the CPU 34 erases the initial time registered in the memory 33 for the present position code for initialization. After the vehicle-mounted controller 30 deletes the registration of the initial time, the vehicle-mounted controller 30 ends the present processing cycle of the flow of FIG. 16, shifts the procedure to a next processing cycle, and makes a transition to data statistics of the efficiency value for a next time period or a next position code.

The procedure of step S28 is performed by the CPU 34 also when the set time T1 has passed from the initial time before efficiency values of the same position code are collected and reach the set number of pieces of data N1. The initial time registered for the present position code is thereby erased (step S24-S28). When efficiency values equal to or more than the set number of pieces of data N1 are not collected in the same time period (within the set time T1 from the initial time) for the same position code, efficiency values in the time period are not handled as valid data. Invalid data during this period may be stored in the memory 33. However, when using a memory capacity more than necessary is to be avoided, a configuration can be adopted in which the invalid data is not stored in the memory 33, or a configuration can be adopted in which the invalid data is stored temporarily but is overwritten as appropriate. Hence, in the present embodiment, valid data is recorded in the memory 33 and transmitted to the server 40 only when pieces of data equal in number to the set number of pieces of data N1 are collected within the continuous set time T1 with regard to the efficiency value of the same position code on condition that the load parameter exceeds the load determination value X.

—Abnormality Determination Processing—

FIG. 17 is a flowchart showing an example of a procedure for determining an abnormality or a sign thereof in the monitoring target by the processing device. The processing of this flowchart is performed by the server 40 for each predetermined period (for example, per day) for each monitoring target. When there are a plurality of dump trucks to be managed, the processing of the flowchart is performed for each monitoring target of each dump truck.

Step S31

When the server 40 starts the processing of FIG. 17, the CPU 43 of the server 40 in step S31 takes statistics of data for a predetermined period (for example, for one day), which is uploaded from the vehicle-mounted controller 30. In the present example, a median value and a quartile range (IQR) of data for each predetermined period (for example, per day) on the above-described average efficiency value are computed as statistical data for the monitoring target for which the presence or absence of an abnormality or a sign thereof is determined.

Step S32

In the following step S32, the CPU 43 of the server 40 compares the statistical data computed in step S31 with the corresponding abnormality determination value D1 read from the memory 42, and thereby determines the presence or absence of an abnormality in the monitoring target. In the present example, the CPU 43 determines whether the median value computed in step S31 is equal to or more than the corresponding abnormality determination value D1. When the median value is less than the abnormality determination value D1, and therefore an abnormality in the monitoring target is presumed, the server 40 shifts the procedure from step S32 to step S38. When the median value is equal to or more than the abnormality determination value D1, the server 40 shifts the procedure from step S32 to step S33.

Step S33

When the server 40 shifts the procedure to step S33, the CPU 43 of the server 40 compares the statistical data computed in step S31 with the corresponding sign determination value D2 read from the memory 42, and thereby determines the presence or absence of a sign of an abnormality in the monitoring target. In the present example, the CPU 43 determines whether the quartile range (difference between the maximum value and the minimum value of the quartile range) computed in step S31 is equal to or less than the corresponding sign determination value D2. When the quartile range is larger than the sign determination value D2, and therefore there is a sign of the occurrence of an abnormality in the monitoring target, the server 40 shifts the procedure from step S33 to step S37. When the quartile range is equal to or less than the sign determination value D2, the server 40 shifts the procedure from step S33 to step S34.

Step S34

When the server 40 shifts the procedure to step S34, the CPU 43 of the server 40 computes a difference between the statistical data computed in step S31 and statistical data for a predetermined period in the past (for example, for the previous day), which is recorded in the memory 42 with regard to the same dump truck (own vehicle). The CPU 43 of the server 40 further determines whether the computed difference is equal to or less than the determination value D3. In the present example, the server 40 shifts the procedure from step S34 to step S37 when the median value obtained by taking statistics of the efficiency value for one latest day is lower by more than the determination value D3 than the median value obtained by taking statistics of the efficiency value for the previous day, and therefore it is determined that there is a sign of an abnormality in the monitoring target. When the difference between the latest median value and the median value for the previous day is equal to or less than the determination value D3, the server 40 shifts the procedure from step S34 to step S35.

Step S35

When the server 40 shifts the procedure to step S35, the CPU 43 of the server 40 computes a difference between the statistical data computed in step S31 and statistical data computed with regard to another dump truck, and determines whether the magnitude of the computed difference is equal to or less than the determination value D4. In the present example, the server 40 shifts the procedure to step S37 when the median value computed in step S31 is lower by more than the determination value D4 than a median value for the same day, which is computed with regard to the corresponding monitoring target of another dump truck travelling on the same site, and therefore it is determined that there is a sign of an abnormality in the monitoring target. When the difference between the median values of the efficiency values of both the dump trucks in the same time period on the same site is equal to or less than the determination value D4, the server 40 shifts the procedure from step S35 to step S36.

Step S36

When the server 40 shifts the procedure to step S36 without presuming any abnormality or any sign thereof in the monitoring target in all of the determinations in steps S32 to S35, the CPU 43 of the server 40 records a determination result to the effect that there is no abnormality in the monitoring target (normality determination) in the memory 42. This determination result may be converted into data in the report format by the CPU 43, and notified to the output terminal 51 or the output terminal 52, at the same time as the determination result is recorded in the memory 42. When the server 40 ends the procedure of step S36, the server 40 ends the present flow of FIG. 17, and stands by until a start time of a next flow (for example, on a next day) (or shifts the procedure to the flow of FIG. 17 for another dump truck or another monitoring target).

Step S37

When the server 40 shifts the procedure to step S37 after observing a sign of an abnormality in the monitoring target in one of the determinations in steps S33 to S35, the CPU 43 of the server 40 records a determination result to the effect that there is a sign of the occurrence of an abnormality in the monitoring target (sign determination) in the memory 42. This determination result may be converted into data in the report format by the CPU 43, and notified to the output terminal 51 or the output terminal 52, at the same time as the determination result is recorded in the memory 42. When the server 40 ends the procedure of step S37, the server 40 ends the present flow of FIG. 17, and stands by until a start time of a next flow (for example, on a next day) (or shifts the procedure to the flow of FIG. 17 for another dump truck or another monitoring target).

Step S38

When the server 40 shifts the procedure to step S38 after presuming the occurrence of an abnormality in the monitoring target in the determination of step S32, the CPU 43 of the server 40 records a determination result to the effect that an abnormality has occurred in the monitoring target (abnormality determination) in the memory 42. This determination result may be converted into data in the report format by the CPU 43, and notified to the output terminal 51 or the output terminal 52, at the same time as the determination result is recorded in the memory 42. When the server 40 ends the procedure of step S38, the server 40 ends the present flow of FIG. 17, and stands by until a start time of a next flow (for example, on a next day) (or shifts the procedure to the flow of FIG. 17 for another dump truck or another monitoring target).

—Report Display—

Figure 18:
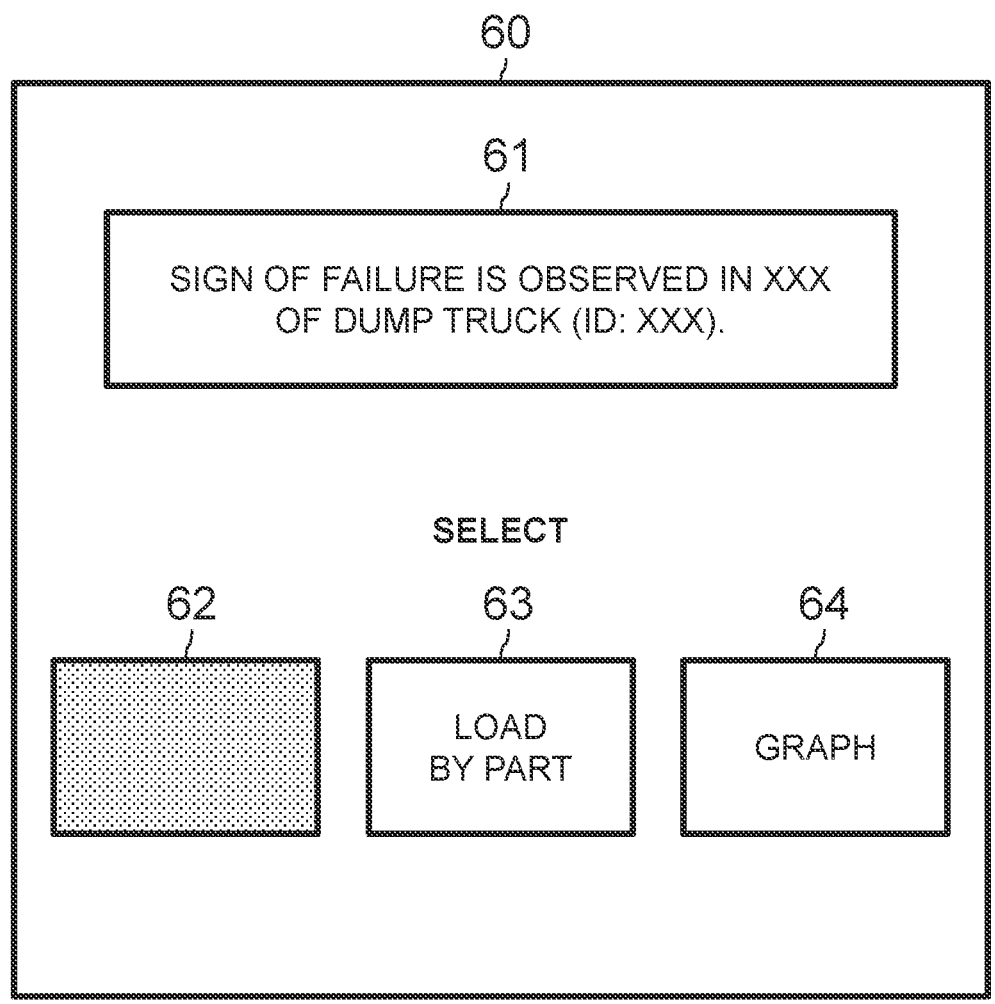
FIG. 18 is a diagram showing an example of a report display screen of an output terminal.
Figure 19:
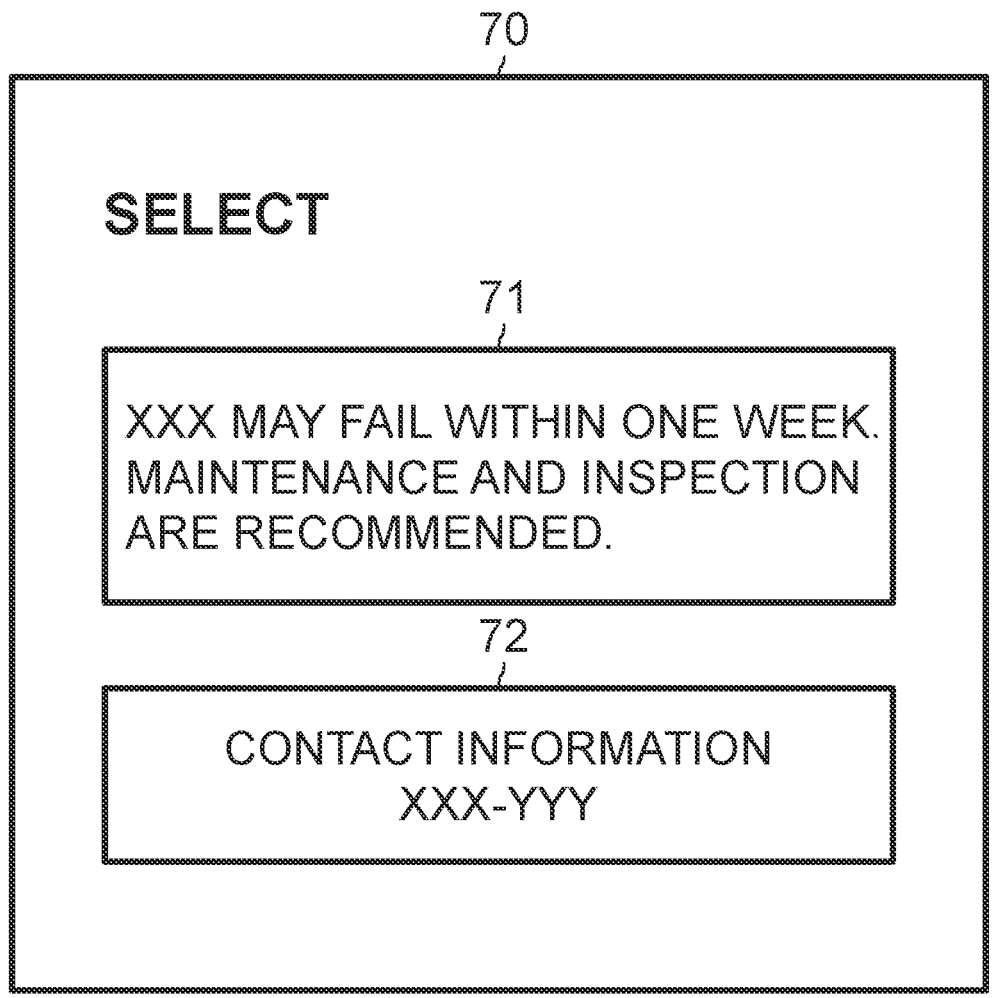
FIG. 19 is a diagram showing an example of a report display screen of the output terminal.

FIG. 18 and FIG. 19 are diagrams showing an example of a report display screen of an output terminal. The notification of the determination results in steps S36 to S38 in FIG. 17 to the output terminal 51 or the output terminal 52 has been mentioned earlier. FIG. 18 shows an example of a report screen 60 displayed on the output terminal at a time of the notification. For example, the notification is made to the output terminal registered for the respective dump truck as the sign determination or the failure determination in FIG. 17 is made, and the report screen 60 is displayed on the display of the output terminal by starting an application related to the notification in the output terminal. When necessary, a configuration can be adopted in which also when a normality determination is made, a notification to that effect is made to the output terminal.

Incidentally, it is needless to say that the screen of FIG. 18 can be not only displayed on the output terminal 51 or the like when the notification is made from the server 40 but also displayed after a report is downloaded by accessing the server 40 from the output terminal 51 or the like. In this case, it is possible to specify a dump truck and a monitoring target on the output terminal 51 or the like, and view a report about the optional monitoring target whose state is desired to be known.

The report screen 60 illustrated in FIG. 18 displays a message field 61 and selection buttons 62 to 64. The message field 61 displays a message to the effect that the monitoring target is faulty, to the effect that there is a sign of a failure, or to the effect that the monitoring target is normal. FIG. 18 illustrates a message notifying that there is a sign of a failure. The present example notifies which monitoring target of which dump truck is likely to fail, as in "sign of failure is observed in XXX of dump truck (ID: XXX)."

The selection buttons 62 and 63 are buttons for displaying a screen 70 in FIG. 19, which notifies of a handling method recommended for a present situation, and at the same time play a role of displaying a failure probability intuitively or numerically. The selection button 62 changes in display color according to conditions, and makes a viewer intuit the conditions by the display color. In conditions where a failure could occur at any moment (for example, a failure is likely to occur within one week), the selection button 62 is, for example, displayed in red or a reddish color (warning color). In conditions where a failure is likely to occur in the near future (for example, a failure is likely to occur within one month), the selection button 62 is, for example, displayed in yellow or a yellowish color (caution color). In conditions where a failure is likely to occur in the not-too-distant future though there is some time before the occurrence of the failure (for example, a failure is likely to occur one month hence or more), the selection button 62 is, for example, displayed in blue or green or a bluish color or a greenish color (notification color). When the selection button 62 is operated, the screen 70 shown in FIG. 19 is displayed.

Incidentally, with regard to the determination of the failure probability, though not described with reference to the flow of FIG. 17, when the quartile range and the determination value D2 in step S33 are compared with each other, for example, two threshold values $\alpha 1$ and $\alpha 2$ ($\alpha 1 < \alpha 2$) are set for the difference between the quartile range and the determination value D2. Degrees of the sign can be classified such that the warning color is selected when the difference between the quartile range and the determination value D2 is equal to or more than $\alpha 2$, such that the caution color is selected when the difference between the quartile range and the determination value D2 is equal to or more than $\alpha 1$ and less than $\alpha 2$, and such that the notification color is selected when the difference between the quartile range and the determination value D2 is less than $\alpha 1$. Also in the determinations in steps S34 and S35, degrees of the sign can be classified on the basis of degrees of the difference from the determination value.

The selection button 63 displays a load by part. For example, when the selection button 63 is operated, a transition is made to a screen (not shown) displaying a load state of each part or each region, and each load state is displayed by a rank of 0 to 5 according to the magnitude level of the load. It is thereby possible to check the load state of each part or each region.

When the selection button 64 is operated, a graph obtained by compiling the data of the efficiency value for a predetermined most recent period with regard to the monitoring target is displayed. The form of the displayed graph is not limited as long as the degree of the condition of the monitoring target such as an abnormality or a sign can be checked by the graph. As an example, a graph can be cited which displays the abnormality determination value and the sign determination value set in advance for the monitoring target together with the statistical data (box plot of the efficiency value per day), as shown in FIG. 13 and FIG. 14, for example. A graph simply showing only the efficiency value (for example, the efficiency value for each predetermined period (per day or the like)) without displaying the abnormality determination value or the sign determination value may be displayed. When such a graph is output for display to the output terminal 51 or the output terminal 52, the manager or the like can determine the condition of the monitoring target separately from the determination result of the processing device 20.

The screen 70 (FIG. 19) displayed by operating the selection button 62 displays a message field 71 and a contact information field 72. The message field 71 displays a message describing details of the conditions. In the example of FIG. 19, the possibility of the occurrence of a failure within one week and a recommendation of maintenance and inspection are described. The contact information field 72 displays contact information (a telephone number, a URL, an email address, or the like) of a company related to the maintenance and inspection of the monitoring target, a serviceperson in charge of the maintenance and inspection, or the like. In a case where the telephone number is displayed, and the output terminal 51 is a smart phone, when the contact information is operated (tapped), a telephone call can be made to the contact information. In a case where the URL is displayed, when the contact information is operated (tapped or clicked, for example), a WEB page of the contact information can be displayed. In a case where the email address is displayed, when the contact information is operated (tapped or clicked, for example), a screen for creating an email to the contact information can be displayed.

Effects (1) According to the present embodiment, the efficiency value of the monitoring target is computed, and the data of the efficiency value with regard to the monitoring target is collected and recorded, or output to the output terminal 51 or the like. The efficiency value is less affected by driving skills of the driver, the state of the travelling road surface, the gradient, or the like than fuel consumption, so that high robustness for determining the condition of the monitoring target (whether the monitoring target is normal, whether the monitoring target is abnormal, or whether there is a sign of an abnormality, for example) can be expected. However, in a state of a low load on the power train, variations in a result of computation of the efficiency value can be increased even in a case of similar driving skills or a similar road surface state for reasons of a high ratio of energy consumed by auxiliary equipment and the like as described above. On the basis of this viewpoint, the present embodiment sequentially computes the load parameter (typically the fuel injection amount) that changes according to the load state of the power train 10, and computes the efficiency value of the monitoring target from the input and output energy of the monitoring target under a condition that the load parameter be larger than the load determination value X.

Consequently, the robustness of the efficiency value computation result is improved, and an abnormality in the power train 10 can be determined rationally by referring to the efficiency value computation result. For example, in a case where an abnormality is found in a certain subsystem or the power train, when a report about the respective efficiency values of constituent parts of the subsystem or the power train is checked, a part in which an abnormality has occurred can be identified specifically. Because an abnormality or a sign thereof in the power train 10 and which part or subsystem in the power train 10 has an abnormality can be determined precisely, it is possible to deal appropriately with a failure or a sign thereof. Because a failure in the power train 10 can be dealt with promptly or beforehand, it is possible to contribute also to suppression of a discharged amount of carbon dioxide and an amount of fuel consumption. In addition, in a case where there is a sign of a failure from the data of the efficiency value, downtime at a time of the occurrence of the failure can be shortened by preparing a replacement part beforehand. The efficiency value of the monitoring target is useful not only for determining an abnormality but also for evaluating the performance of the monitoring target. There is thus an advantage of being able to tune the monitoring target that has room for improvement in terms of performance.

(2) The robustness of the efficiency value can be further improved by taking statistics after classifying the data of the efficiency value by travelling area, and sorting the classified data by the number of pieces of data, as described with reference to FIG. 10 and FIG. 11. In particular, when the vehicle-mounted controller 30 takes statistics of the data of the efficiency value and the server 40 makes abnormality determination or the like as in the present embodiment, the volume of data transmitted from the vehicle-mounted controller 30 to the server 40 is reduced. It is therefore possible to reduce communication cost and a computation load on the server 40.

(3) When the statistical data (for example, a box plot) of the efficiency value as illustrated in FIG. 13 and FIG. 14 is output to the output terminal 51 or the like together with the abnormality determination value and the sign determination value, the manager or the like can visually determine the condition of the monitoring target by comparing the efficiency value with the determination values.

(4) When the processing device 20 compares the efficiency value with the abnormality determination value and the sign determination value, and records a determination result with regard to an abnormality or a sign thereof in the monitoring target or outputs the determination result to the output terminal, the manager or the like can be notified of the condition of the monitoring target in real time.

(5) By taking statistics of the efficiency value, computing a median value, and determining that an abnormality has occurred in the monitoring target when the median value falls below the abnormality determination value, it is possible to make abnormality determination more accurately than to determine an abnormality on the basis of an instantaneous efficiency value computed from the input and output energy at a certain point in time.

(6) By taking statistics of the efficiency value and computing the quartile range, it is possible to detect a state (sign) in which the monitoring target has not failed but is likely to fail on the basis of the difference between the maximum value and the minimum value of the quartile range (that is, the magnitude of data variation).

(7) Whether there is an abnormality or a sign thereof in the monitoring target can be determined also by determining a degree by which the efficiency value is decreased as compared with data in the past with regard to the same dump truck.

(8) Whether there is an abnormality or a sign thereof in the monitoring target can be determined also by determining a degree by which the efficiency value is lower than that of another dump truck.

(9) By using the output terminal 51, which is a portable terminal having a display, it is possible to check the efficiency value of the dump truck and a result of determination of an abnormality or the like regardless of place, and deal with a failure or the like in the monitoring target promptly and flexibly.

Second Embodiment

A second embodiment of the present invention will be described with reference to FIGS. 20 to 23. The present embodiment is an example in which the gradient is set as the load parameter, and efficiency is computed during travelling in a gradient region having a certain gradient or more (gradient equal to or more than the load determination value X). The gradient can be obtained from the signal of the sensor S6, or can also be obtained from the position of the dump truck and terrain profile data when the terrain profile data can be used. In addition, when neither of the terrain profile data nor the sensor S6 is used, whether the gradient (rising gradient) of the travelled road surface is a certain gradient or more can be estimated from the fuel injection amount, for example. In the following, description will be made of a method of estimating whether the gradient of the travelled road surface is a certain gradient or more.

FIGS. 20 to 22 is diagrams showing an example of plotting an average value of the fuel injection amount for each mesh in the position coordinate system. A plot of one point corresponds to one mesh. Each of the figures is created on the basis of travelling data for one day of a same dump truck (one dump truck). In each figure, an axis of abscissas indicates latitude, an axis of ordinates indicates longitude, and the thickness of a travelling trajectory depicted by connecting plots indicates the magnitude of the fuel injection amount.

FIG. 20 is a diagram showing an example in which the data of the fuel injection amount is filtered on condition that a cargo is being transported (the loading amount is larger than a predetermined value). The figure shows that the dump truck travels to various places within a site.

FIG. 21 is a diagram showing an example of extracting data whose number of pieces of sampling data per mesh is larger than a predetermined value from the data of FIG. 20. The travelling trajectory extracted in this figure is estimated to be places where the dump truck frequently travels at low speed on this day.

FIG. 22 is a diagram showing an example of extracting data whose fuel injection amount is larger than a predetermined value from the data of FIG. 21. The travelling trajectory extracted in this figure is estimated to be places where acceleration resistance or gradient resistance is high. At this time, during travelling acceleration during which the acceleration resistance is increased, the power train is in a transient state, and the efficiency value tends to vary. Thus, the fuel injection amount may be increased even on a ground that is not a gradient ground. Accordingly, when filtering is performed by the number of data samplings within a predetermined time within a mesh in the same manner as the first embodiment, conditions that greatly vary efficiency as in a case of reacceleration from decelerating travelling after high-speed driving are removed, and gradient ground travelling data can be extracted. In addition, it is also possible to compute the data of FIG. 22 with regard to a plurality of dump trucks, and estimate that a place where the number of pieces of data for average efficiency is larger than a predetermined value is a gradient ground.

Figure 23:
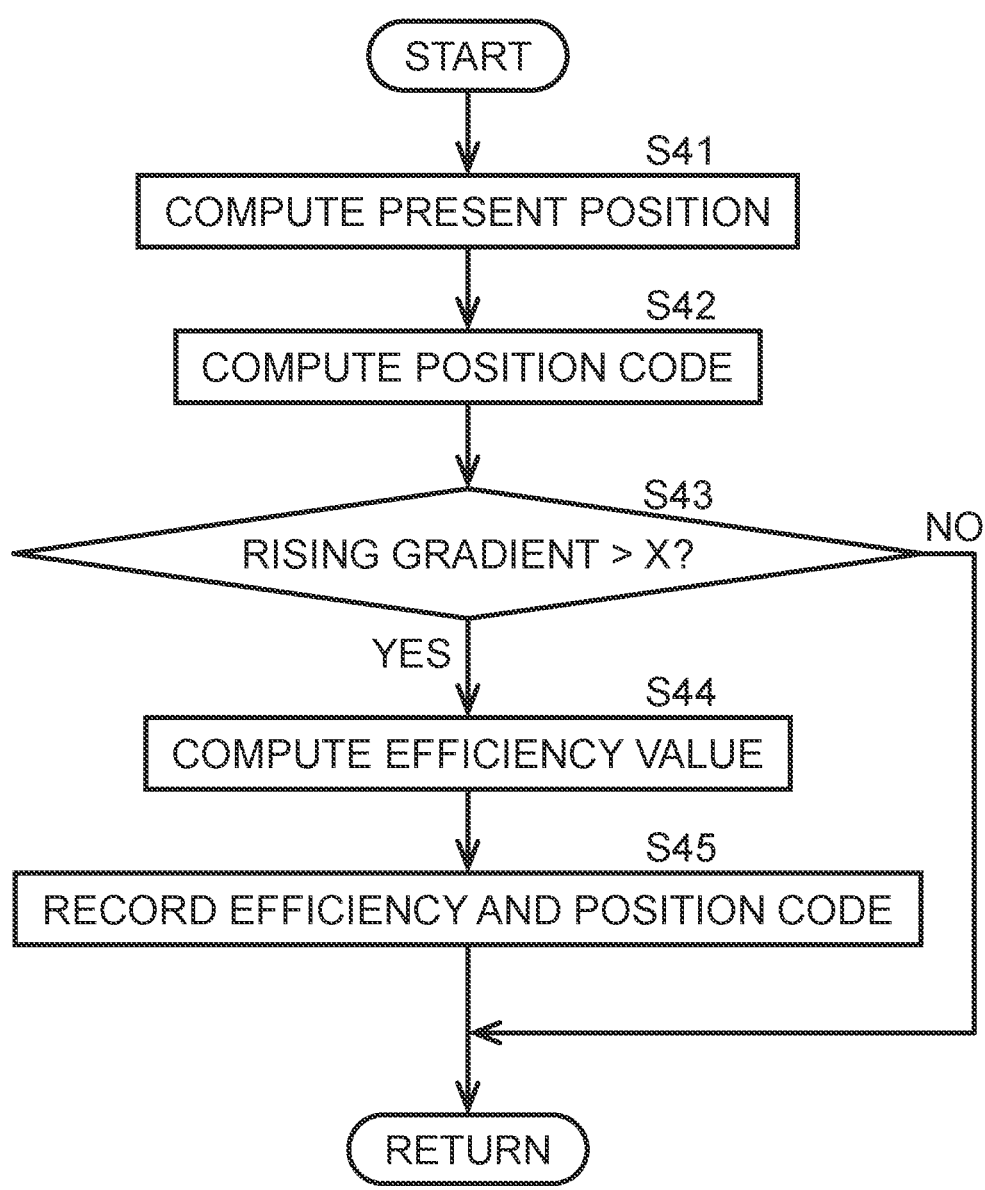
FIG. 23 is a flowchart showing an example of a procedure for computing the efficiency value of the monitoring target by a processing device provided to a vehicle body management system according to a second embodiment of the present invention.

FIG. 23 is a flowchart showing an example of a procedure for computing the efficiency value of the monitoring target by the processing device. The flowchart of the figure corresponds to the flowchart of FIG. 15 according to the first embodiment. While electric power is supplied to the vehicle-mounted controller 30, or while the dump truck in which the vehicle-mounted controller 30 itself is included travels, the vehicle-mounted controller 30 reads the program stored in the memory 33 and repeatedly performs the flow of FIG. 23 by the CPU 34 in cycles of 0.1 seconds. In the present embodiment, when the processing of FIG. 23 is performed, the efficiency value of each monitoring target under the high-load condition is computed, and is recorded in the memory 33 together with the position code (to be described later). Thereafter, the processing of FIG. 16 and FIG. 17 is performed as in the first embodiment.

Step S41

When the vehicle-mounted controller 30 starts the flow of FIG. 23, the vehicle-mounted controller 30 in step S41 is supplied with signals of the sensors S1 to S7 and the positioning device S8, and computes the present position of the dump truck by the CPU 34 on the basis of the reception data of the positioning device S8. A method of computing the position in this step is similar to that of step S14 in FIG. 15.

Step S42

In the following step S42, the vehicle-mounted controller 30 identifies a mesh to which the present position of the dump truck belongs, and identifies a position code of the calculated mesh. A method of computing the position code in this step is similar to that of step S15 in FIG. 15.

Step S43

In the following step S43, the CPU 34 of the vehicle-mounted controller 30 determines whether the rising gradient (load parameter) of the mesh of the position code, in which the dump truck is currently positioned, is larger than a predetermined value (load determination value X for the gradient). This step is a procedure corresponding to step S12 in FIG. 15. Data on the gradient of the mesh may be computed from the terrain profile data (data obtained in advance by a survey or the like) or the signal of the sensor S6. When neither of the terrain profile data nor the sensor S6 is used, the data on the gradient of the mesh may be computed by the method described with reference to FIGS. 20 to 22. When the load parameter is larger than the load determination value X, the vehicle-mounted controller 30 shifts the procedure from step S43 to step S44. When the load parameter is equal to or less than the load determination value X, the vehicle-mounted controller 30 ends the present processing cycle of the flow of FIG. 23, and shifts the procedure to a next processing cycle.

Step S44

When the vehicle-mounted controller 30 shifts the procedure to step S44, the vehicle-mounted controller 30 computes an efficiency value of each monitoring target by obtaining a ratio between input energy and output energy of each monitoring target. The processing performed in this step is similar to that of step S13 in FIG. 15.

Step S45

In the following step S45, the vehicle-mounted controller 30 records a data set of various kinds of efficiency values computed in step S44 and the position code and time added thereto in the memory 33. When the vehicle-mounted controller 30 ends the procedure of step S45, the vehicle-mounted controller 30 ends the present processing cycle of the flow of FIG. 15, and shifts the procedure to a next processing cycle. The processing performed in this step is similar to that of step S16 in FIG. 15.

Effects similar to those of the first embodiment can be obtained also when the efficiency value is computed as in the present embodiment. In addition, by comparing results of travelling in the same places, it is possible to expect an improvement in determination accuracy in a comparison with data in the past (step S34) or a comparison with the data of another vehicle body (step S35).

(Modifications)

The above description has been made by taking as an example a configuration in which functions of the processing device 20 are shared by the vehicle-mounted controller 30 and the server 40. However, a configuration can also be adopted in which all of the functions of the processing device are performed by the vehicle-mounted controller 30 when the efficiency value of the monitoring target of only one dump truck is evaluated, for example. In this case, there is an advantage of being able to perform the determination processing of FIG. 17 in real time, which is performed as batch processing per day in the first and second embodiments. Even in a case where a plurality of dump trucks are subjected to centralized management, when the dump trucks are configured to be able to communicate with each other, for example, it is possible to provide the vehicle-mounted controller 30 of a specific dump truck with the functions of the server 40, and evaluate the efficiency value of each dump truck in the specific dump truck.

Conversely, while in the first and second embodiments, description has been made by taking as an example a configuration in which the processing of FIG. 16 is performed by the vehicle-mounted controller 30, a configuration may also be adopted in which the data of the efficiency value computed in FIG. 15 and FIG. 23 is transmitted to the server 40 with the vehicle body ID added to the data, and the processing of FIG. 16 is performed in the server 40. In this case, a computation load on the vehicle-mounted controller 30 can be reduced. In addition, abundant efficiency data collected from each dump truck can be analyzed in the management center or the like, and the determination values such as the set time T1, the set number of pieces of data N1, and the like can be adjusted and optimized in the server 40.

In the first and second embodiments, description has been made by taking as an example a case where both of an abnormality and a sign thereof in the monitoring target are determined. However, a configuration may be adopted in which only one of an abnormality and a sign thereof in the monitoring target is determined. In addition, while an example has been described in which three determination procedures (steps S33, S34, and S35) are performed in FIG. 17 with regard to a sign of an abnormality, a configuration may be adopted in which only one or two of these determinations are made, or a configuration may be adopted in which a further determination is added and performed. The abnormality determination is not limited to the comparison of the median value, but a configuration may be adopted in which an abnormality is evaluated by using another value (including the efficiency value itself) corresponding to the efficiency value. The processing described with reference to FIG. 17 is merely an example of the determination of an abnormality or a sign thereof by using the efficiency value.

Further, in the first and second embodiments, description has been made by taking a dump truck as an example of the vehicle body managed by the vehicle body management system. However, another construction machine such as a wheel excavator, or a wheel loader can be managed by the vehicle body management system. Basically, a wheel type vehicle body that moves over a reasonable distance is assumed as the management target. However, when necessary, a crawler type vehicle body can be managed by the vehicle body management system.

DESCRIPTION OF REFERENCE CHARACTERS 1, 1a, 1b: Dump truck (vehicle body)
10: Power train (monitoring target)
11: Prime mover (part, subsystem, monitoring target)
12: Generator (part, subsystem, monitoring target)
13: Rectifier (part, subsystem, monitoring target)
14: Inverter (part, subsystem, monitoring target)
15: Travelling electric motor (part, subsystem, monitoring target)

20: Processing device
30: Vehicle-mounted controller (processing device)
40: Server (processing device)
51, 52: Output terminal
D1: Abnormality determination value
D2: Sign determination value
D3, D4: Determination value
S1 to S7: Sensor
S8: Positioning device
X: Load determination value

The invention claimed is:

1. A vehicle body management system for managing a vehicle body having a power train formed by a plurality of parts including a prime mover, the vehicle body management system comprising:
a processing device having a memory containing a program that calculates an efficiency value, which is a ratio of output energy to input energy of a monitoring target, the monitoring target being the power train or a part or a subsystem of the power train, on a basis of digital data of the input energy to the monitoring target and the output energy from the monitoring target calculated based on digitally converted input signal from a sensor provided to the vehicle body, and a CPU executing the program; and
an output terminal that outputs the efficiency value of the monitoring target,
wherein the processing device causes the CPU to execute the program, which configures the CPU to:
compute a signal as a load parameter to determine a high-load condition of the power train based on the input signal from the sensor provided to the vehicle body,
determine whether the load parameter is larger than a load determination value set in advance,
extract the digital data of input energy and output energy of the monitoring target under the high-load condition from the digital data of the input signal from the sensor on a condition that the load parameter be larger than the load determination value,
compute the efficiency value of the monitoring target on a basis of the digital data of input energy and output energy, and
record the computed efficiency value of the monitoring target.

2. The vehicle body management system according to claim 1,
wherein the processing device is configured to compute a fuel injection amount of the prime mover, a loading amount of a cargo, or a road surface gradient as the load parameter.

3. The vehicle body management system according to claim 1,
wherein the vehicle body includes a positioning device, and
wherein the processing device is configured to:
compute a position of the vehicle body on a basis of reception data of the positioning device, and add the position of the vehicle body to the efficiency value,
classify the efficiency value by the position of the vehicle body,
collect the efficiency value with regard to a travelling region in which number of pieces of data of the efficiency value within a set time is equal to or more than a set number of pieces of data, and
compute statistical data of the collected efficiency value.

4. The vehicle body management system according to claim 3,
wherein the output terminal outputs, together with the statistical data, an abnormality determination value for determining occurrence of an abnormality or a sign determination value for determining a sign of an abnormality, the abnormality determination value or the sign determination value being set in advance for the monitoring target.

5. The vehicle body management system according to claim 3,
wherein the processing device is configured to:
determine a presence or absence of an abnormality in the monitoring target or presence or absence of a sign of the abnormality by comparing, with the statistical data, an abnormality determination value for determining occurrence of the abnormality or a sign determination value for determining the sign of the abnormality, the abnormality determination value or the sign determination value being set in advance for the monitoring target, and
wherein the output terminal outputs a determination result of the processing device.

6. The vehicle body management system according to claim 5,
wherein the processing device is configured to:
compute a median value of the efficiency value as the statistical data, and
determine that an abnormality has occurred in the monitoring target when the median value falls below the abnormality determination value.

7. The vehicle body management system according to claim 5,
wherein the processing device is configured to:
compute a quartile range of the efficiency value as the statistical data, and
determine that there is a sign of an abnormality in the monitoring target when a difference between a maximum value and a minimum value of the quartile range exceeds the sign determination value.

8. The vehicle body management system according to claim 3,
wherein the processing device is configured to:
obtain a difference between the statistical data and statistical data computed in a past, and
determine that there is an abnormality or a sign of an abnormality in the monitoring target when magnitude of the difference is larger than a determination value.

9. The vehicle body management system according to claim 3,
wherein the processing device is configured to:
obtain a difference between the statistical data and statistical data computed with regard to another vehicle body, and
determine that there is an abnormality or a sign of an abnormality in the monitoring target when magnitude of the difference is larger than a determination value.

10. The vehicle body management system according to claim 1,
wherein the power train includes, as the parts, an engine, a generator driven by the engine, a rectifier that converts output electric power of the generator into direct-current power, an inverter that converts the output electric power of the rectifier into three-phase alternating-current power, and a travelling electric motor driven by the three-phase alternating-current power from the inverter.

11. The vehicle body management system according to claim 1,
  wherein the output terminal is a portable terminal having a display.

* * * * *